US012634315B2

(12) United States Patent　(10) Patent No.: US 12,634,315 B2

Boucadair et al.　(45) Date of Patent: May 19, 2026

(54) METHODS FOR TRAFFIC REDIRECTION, CORRESPONDING TERMINAL, CONTROLLER, AUTHORIZATION SERVER, NAME RESOLUTION SERVERS AND COMPUTER PROGRAM

(71) Applicant: ORANGE, Issy-les-Moulineaux (FR)

(72) Inventors: Mohamed Boucadair, Châtillon (FR); Christian Jacquenet, Châtillon (FR)

(73) Assignee: ORANGE, Issy-les-Moulineaux (FR)

( * ) Notice: Subject to any disclaimer, the term of this patent is extended or adjusted under 35 U.S.C. 154(b) by 366 days.

(21) Appl. No.: 18/258,918

(22) PCT Filed: Dec. 21, 2021

(86) PCT No.: PCT/FR2021/052420

§ 371 (c)(1),
(2) Date: Jun. 22, 2023

(87) PCT Pub. No.: WO2022/136796

PCT Pub. Date: Jun. 30, 2022

(65) Prior Publication Data

US 2024/0048576 A1　Feb. 8, 2024

(30) Foreign Application Priority Data

Dec. 23, 2020　(FR) ..................................... 2014109

(51) Int. Cl.
*H04L 9/40*　(2022.01)

(52) U.S. Cl.
CPC ...... *H04L 63/1425* (2013.01); *H04L 63/0236* (2013.01); *H04L 63/20* (2013.01)

(58) Field of Classification Search
CPC ............. H04L 63/1425; H04L 63/0236; H04L 63/20; H04L 61/4552; H04L 61/4511; H04L 63/126; H04L 63/1483
See application file for complete search history.

(56) References Cited

U.S. PATENT DOCUMENTS

| | | | | |
|---|---|---|---|---|
| 8,526,405 B2 * | 9/2013 | Curtis | ..................... | H04L 67/02 |
| | | | | 370/339 |
| 2009/0112814 A1 * | 4/2009 | Statia | .................... | G06F 16/951 |

(Continued)

FOREIGN PATENT DOCUMENTS

| | | |
|---|---|---|
| CN | 110113364 A | 8/2019 |
| JP | 2012108947 A | 6/2012 |

(Continued)

OTHER PUBLICATIONS

Shaikh et al., "On the Effectiveness of DNS-based Server Selection", Apr. 2001, Twentieth Annual Joint Conference of the IEEE Computer and Communications Society, vol. 3, pp. 1801-1810 (Year: 2001).*

(Continued)

*Primary Examiner* — Kenneth W Chang

(74) *Attorney, Agent, or Firm* — David D. Brush; Westman, Champlin & Koehler, P.A.

(57)　ABSTRACT

Methods for traffic redirection, corresponding terminal, controller, authorization server, name resolution servers and computer program. A name resolution method implemented in a terminal connected to a communication network includes: transmitting, to a first name resolution server, a name resolution message via a secure communication channel between the terminal and the first name resolution server; if a redirection of the DNS traffic of the terminal is authorized, obtaining at least one identifier of a second name resolution server for the redirection; and executing at least one action for managing the redirection of the DNS traffic of the terminal to the second name resolution server, at least from among: verifying legitimacy of the second name resolution server, sending an indication of a failure of a connection of the terminal with the second name resolution (Continued)

Figure 1A:
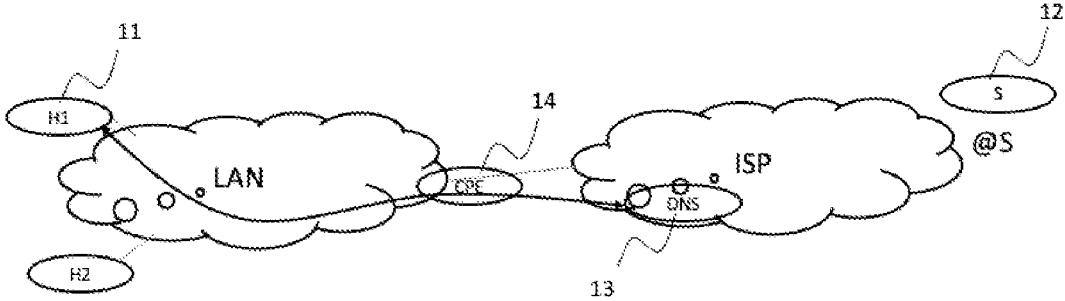

server; and requesting deactivation of the redirection of the DNS traffic to the second name resolution server.

18 Claims, 10 Drawing Sheets

(56)                     References Cited

U.S. PATENT DOCUMENTS

| | | | | |
|---|---|---|---|---|
| 2010/0031362 A1* | 2/2010 | Himberger | ............. | H04L 63/168 |
| | | | | 726/25 |
| 2010/0121981 A1* | 5/2010 | Drako | ................. | H04L 61/4511 |
| | | | | 709/245 |
| 2011/0060838 A1* | 3/2011 | Yeung | ..................... | H04L 69/40 |
| | | | | 709/228 |
| 2011/0321139 A1* | 12/2011 | Jayaraman | .............. | G06F 21/53 |
| | | | | 726/4 |
| 2012/0099433 A1 | 4/2012 | Willars et al. | | |
| 2012/0297478 A1 | 11/2012 | Martin et al. | | |
| 2014/0380041 A1* | 12/2014 | Gupta | ................. | H04L 61/5076 |
| | | | | 713/162 |
| 2015/0350044 A1* | 12/2015 | Thomassian | ........ | H04L 61/4511 |
| | | | | 370/252 |
| 2018/0255153 A1 | 9/2018 | Koizumi | | |

FOREIGN PATENT DOCUMENTS

| | | |
|---|---|---|
| JP | 2013517726 A | 5/2013 |
| JP | 2014502434 A | 1/2014 |
| JP | 2018146997 A | 9/2018 |

OTHER PUBLICATIONS

Cachin et al., "Secure Distributed DNS", Jul. 2004, International Conference on Dependable Systems and Networks, pp. 423-432 (Year: 2004).*
International Search Report dated Apr. 8, 2022 for corresponding International Application No. PCT/FR2021/052420, filed Dec. 21, 2021.
Written Opinion of the International Searching Authority dated Apr. 8, 2022 for corresponding International Application No. PCT/FR2021/052420, filed Dec. 21, 2021.
Arya Bharat et al., "A client-side anti-pharming (CSAP) approach", 2016 International Conference on Circuit, Power and Computing Technologies (ICCPCT), IEEE, Mar. 18, 2016 (Mar. 18, 2016), p. 1-6, XP032934324.
Dafalla Yousif et al., "Prosumer Nanogrids: A Cybersecurity Assessment", IEEE Access, IEEE, USA, vol. 8, Jul. 15, 2020 (Jul. 15, 2020), p. 131150-131164, XP011800834.
Droms, R., "Dynamic Host Configuration Protocol", Request for Comments: 2131, Mar. 1997.
Alexander, S. et al., "DHCP Options and BOOTP Vendor Extensions", Request for Comments: 2132, Mar. 1997.
Rigney, C. et al., "Remote Authentication Dial in User Service (RADIUS)", Request for Comments: 2865, Jun. 2000.
Narten, T. et al., "Neighbor Discovery for IP version 6 (IPv6)", Request for Comments: 4861, Sep. 2007.
Cooper, D. et al., "Internet X.509 Public Key Infrastructure Certificate and Certificate Revocation List (CRL) Profile", Request for Comments: 5280, May 2008.
Hu, Z. et a;., "Specification for DNS over Transport Layer Security (TLS)", Request for Comments: 7858, May 2016.
Watsen, K., "NETCONF Call Home and RESTCONF Call Home", Request for Comments: 8071, Feb. 2017.
Reddy, T. et al., "DNS over Datagram Transport Layer Security (DTLS)", Request for Comments: 8094, Feb. 2017.
Mrugalski, T. et al., "Dynamic Host Configuration Protocol for IPV6 (DHCPv6)", Request for Comments: 8415, Nov. 2018.
Hoffman, P. et al., "DNS Queries over HTTPS (DoH)", Request for Comments: 8484, Oct. 2018.
Hoffman, P. et al., "DNS Terminology", Request for Comments: 8499, Jan. 2019.
"TR-069 CPE WAN Management Protocol v1.1", broadband forum, Technical Report, Version: Issue 1 Amendment 2, Version Date: Dec. 2007.
Huitema, C. et al., "Specification of DNS over Dedicated QUIC Connections draft-ietf-dprive-dnsoquic-02", Intended status: Standards Track, Feb. 22, 2021.
Boucadair, M. et al., "Supporting Redirection for DNS Queries over HTTPS (DoH) draft-btw-dprive-rfc8484 clarification-00", Updates: 8484, Aug. 27, 2020.
English translation of the Written Opinion of the International Searching Authority dated Apr. 8, 2022 for corresponding International Application No. PCT/FR2021/052420, filed Dec. 21, 2021.
English translation of the Japanese Office Action dated Nov. 6, 2025 for corresponding Japanese Patent Application No. 2023-538805.

\* cited by examiner

54

541

Info

55

551

Info

METHODS FOR TRAFFIC REDIRECTION, CORRESPONDING TERMINAL, CONTROLLER, AUTHORIZATION SERVER, NAME RESOLUTION SERVERS AND COMPUTER PROGRAM

CROSS-REFERENCE TO RELATED APPLICATIONS

This Application is a Section 371 National Stage Application of International Application No. PCT/FR2021/052420, filed Dec. 21, 2021, which is incorporated by reference in its entirety and published as WO 2022/136796 A, on Jun. 30, 2022, not in English.

1. FIELD OF THE INVENTION

The field of the invention is that of communications within a communication network, for example a computer network implementing the IP protocol. In particular, the invention relates to value-added IP services.

More specifically, the invention relates to name resolution services, for example DNS ("Domain Name System"), and provides a solution for guaranteeing the integrity and availability of the DNS service and detecting the presence of a malicious piece of equipment involved in name resolution.

2. PRIOR ART

The DNS system is a major component in the provision of IP services.

Indeed, a DNS service allows associating a resource (for example of the domain name type (FQDN ("Fully Qualified Domain Name")), URI ("Uniform Resource Identifier") with one or more IP address(es) to access this resource. For example, the DNS service enables a terminal to obtain the IPv4 and/or IPv6 addresses associated with a domain name.

Different solutions may be considered to provide a DNS service to a terminal.

Examples based on the use of a residential gateway, also called HG, standing for "Home Gateway", or CPE, standing for "Customer Premises Device", are described hereinafter, with reference to FIGS. 1A to 1C.

Recall that such a home gateway conventionally serves as an interface between the local area network ("Local Area Network" (LAN)) of the user and the network of an operator with which the user has subscribed to a service offer ("Internet Service Provider" (ISP)). Hence, it is a piece of equipment for access to the network of an operator through which all of the characteristic traffic of the different services subscribed to by the user transits, and which also supports a set of services provided locally to the terminals (for example, FTP service "File Transfer Protocol", NFS service "Network File System", media server).

When connecting a CPE to the network, the operator conventionally provides the CPE with the information necessary to access the connectivity service. Thus, the operator assigns an IPv4 address and/or an IPv6 prefix which may be associated with the CPE to establish IPv4 and/or IPv6 communications from/to the terminals connected to this CPE. The operator also provides the CPE with a list of DNS servers to use for name resolution. To do so, protocols such as DHCP for IPv4 ("Dynamic Host Configuration Protocol", as described in the documents RFC 2131 ("Dynamic Host Configuration Protocol", R. Droms et al., March 1997) and RFC 2132 ("DHCP Options and BOOTP Vendor Extensions", S. Alexander, March 1997), DHCPv6 for IPv6, as described in the document RFC 8415 ("Dynamic Host Configuration Protocol for IPv6 (DHCPv6)", T. Mrugalski et al., November 2018), or ND for IPv6 ("Neighbour Discovery protocol", as described in the document RFC 4861 ("Neighbour Discovery for IP version 6 (IPv6)", T. Narten et al., September 2007) may be used between the CPE and the access network. Other mechanisms such as the CWMP ("CPE WAN Management Protocol") may be used for the configuration of the CPE. Other mechanisms such as the CWMP ("CPE WAN Management Protocol") protocol may be used for the configuration of the CPE.

Figure 1B:
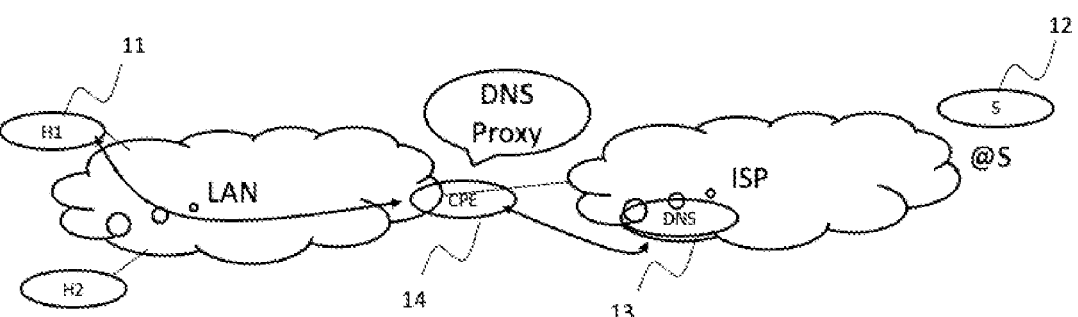
Figure 1C:
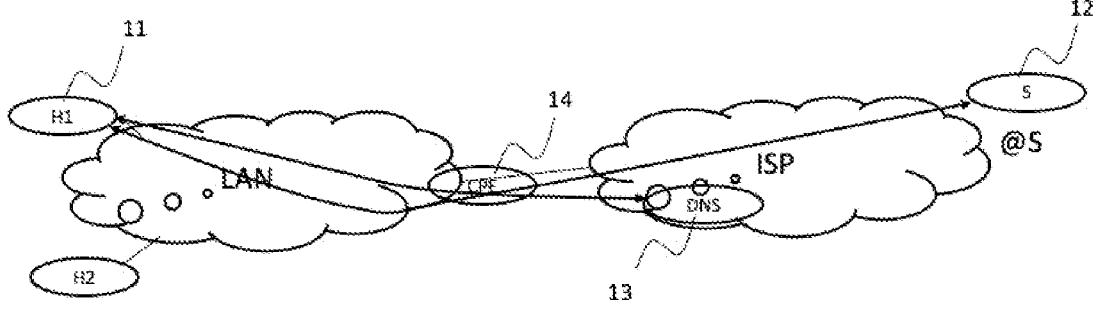

Thus, as illustrated in FIGS. 1A to 1C, a terminal H1 11 (or an application), present in a local area network LAN, wishes to establish a communication with a remote server S 12, identified by a domain name (for example FQDN), for example "notreexample.com". A DNS client embedded in the terminal H1 11 may send a DNS request, also called DNS resolution request, of the A type (if the terminal supports IPv4) and/or AAAA type (if the terminal supports IPv6) to one of the DNS servers 13 provided by the operator and hosted in the access network (for example) to obtain the IP addresses associated with the domain name "notreexample.com".

It should be recalled that a server that may be reached in IPv4 may publish an A type DNS record, while a server that may be reached in IPv6 may publish an AAAA type record. A server reachable in IPv4 and IPv6 can publish A and AAAA type records. A terminal that wishes to reach such a server should specify the type of the record in the DNS request (A or AAAA). A terminal that supports IPv4 and IPv6 may send two DNS requests: the first request indicates an A-type record and the second indicates an AAAA-type record.

The DNS request may be sent directly from the terminal H1 11 to the DNS server 13, as illustrated in FIG. 1A, or sent to the CPE 14 when it embeds a DNS proxy (also called DNS relay or "DNS forwarder" as defined in the document RFC 8499-"DNS Terminology", P. Hoffman et al., January 2019), as illustrated in FIG. 1B. In the latter case, the CPE 14 may relay the DNS request to the DNS server 13 if no response is found in its local cache.

The DNS server 13 may respond with a list of IP addresses (for example @S) if at least one entry corresponding to the pursued domain name is available in its database for the requested record type (A or AAAA), or relay the request to another DNS server according to the hierarchical structure of the DNS architecture if the DNS server 13 does not have such an entry. In turn, the response received from another DNS server located higher in said hierarchy (authoritative server, for example) is relayed by the DNS server 13 initially solicited to the terminal H1 11.

The DNS response may be sent directly from the DNS server 13 to the terminal H1 11, as illustrated in FIG. 1A, or sent to the CPE 14 in the event of the presence of a "DNS forwarder" as illustrated in FIG. 13. In the latter case, the "DNS forwarder" of the CPE 14 relays the DNS response to the terminal H1 11.

As illustrated in FIG. 1C, the terminal H1 11 may thus extract the IP address (or addresses) contained in the response (for example @S), then establish communication with the server S 12, by sending a request for connection to one of the returned addresses (for example @S).

A DNS server is called a nominal server if it has been declared, by the operator through the access network, in a communication device, typically when attaching this device to the network, or by means of a prior configuration, for example a "factory" configuration. During this step, the communication device retrieves the accessibility information from one or more (nominal) DNS server(s) provided by the operator(s). The accessibility information may comprise a list of IP addresses, a port number, an authentication reference, etc. An operator may be a connectivity, voice over IP, etc., service provider; each of these operators may thus provide its own DNS service typically by hosting one or more DNS server(s) within their infrastructures. The service may be provided via a fixed or mobile infrastructure (for example, of the PLMN type, "Public Land Mobile Network").

Moreover, nowadays, more and more third-party entities offer a public DNS service ("Public Resolvers"). For example, such DNS servers are operated by entities like "Google Public DNS®", "Cloudflare®" or QUAD9®.

More and more clients replace or add to the DNS configuration provided by their operator, that one enabling them to access these public DNS servers.

Thus, a communication device may retrieve a new DNS configuration for each of its active network interfaces (fixed, mobile, WLAN ("Wireless Local Area Network"), etc.). Other information (for example, accessibility of SIP ("Session Initiation Protocol") servers) may also be provided to the communications device.

A drawback of DNS server discovery mechanisms within a LAN network is that they are not secure.

Figure 2:
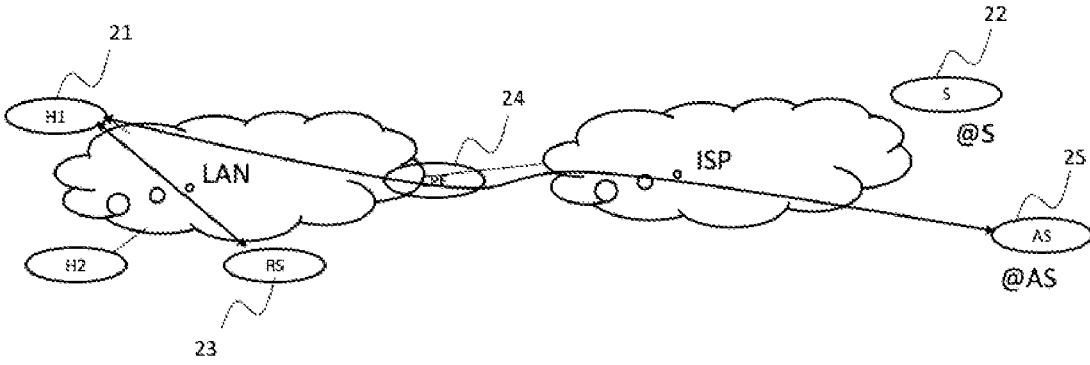

For example, as illustrated in FIG. 2, when the terminal H1 21 connects to the local area network LAN, it could receive messages from a malicious device RS 23 in response to its solicitations for example according to the DHCP or ND protocols. Thus, the terminal H1 21 could receive a message of the router advertisement type RA ("Router Advertisement") originating from the malicious device RS 23, and consider that the malicious device RS 23 is its default router.

The terminal H1 21, which wishes to establish communication with the remote server S 22 identified by a domain name, may then send a DNS request to the malicious device RS 23, instead of sending it to the CPE 24. The malicious equipment RS 23 may host a malicious DNS server and respond with the address of a malicious remote server AS 25 (for example @AS).

Afterwards, the terminal H1 21 may extract the IP address (or addresses) contained in the response (for example @AS), then establish communication with the malicious server AS 25.

Thus, this lack of a secure discovery mechanism within the LAN network may facilitate the execution of attacks that enable the interception of sensitive data of the user (for example personal data) and the redirection to malicious sites as illustrated in FIG. 2.

A considered first solution is based on the use of authentication certificates.

Nonetheless, such a solution is not sufficient to detect malicious equipment. Indeed, a malicious piece of equipment may present a valid certificate, obtained from a valid certification authority ("Certification Authority"), which might mislead the equipment of the LAN.

In order to solve this security problem, some browsers and applications use a list of authorised servers ("accept-list" or "white-list",), maintained by the Internet service providers or the application, to decide whether the discovered DNS server is legitimate (i.e., trusted) or not. For example, the list of authorised servers ("Trusted Recursive Resolver") by Firefox® is accessible via the link: https://wiki.mozilla.org/Trusted_Recursive_Resolver.

If the discovered DNS server is legitimate (i.e., the discovered server belongs to the list), the client/terminal may then proceed with migration from an unsecure connection (DNS according to the UDP/TCP protocol on port 53, also called Do53) to a secure connection (for example DNS according to the HTTPS (DoH) protocol as described in the document RFC 8484-"DNS Queries over HTTPS (DoH)", P. Hoffman et al., October 2018, or DNS over QUIC (DoQ) as described in the document "Specification of DNS over Dedicated QUIC Connections", C. Huitema et al., Oct. 20, 2020).

A difficulty with this procedure for automatically updating an unsecure connection to a secure connection ("auto-upgrade") lies in maintaining the list of authorised servers. Indeed, its content and/or its size may change rapidly, in particular by adding or removing servers.

The restriction of such a list of authorised servers only to servers operated by Internet Service Providers (ISPs) or application providers also has implications for the provision of services that require the presence of a DNS relay, also commonly called "DNS forwarder", in the local area network. Indeed, some services offered to the terminals connected to a local area network require the activation of a local "DNS forwarder". Hence, local "DNS forwarders" should be added to this list of authorised servers. Nonetheless, it should be noted that these "DNS forwarders" cannot be reached from the Internet.

In order to solve this problem, a solution has been proposed in particular for redirecting the DNS requests conveyed in HTTPS messages, i.e. according to a secure connection, described in the document "Supporting Redirection for DNS Queries over HTTPS (DoH)", M. Boucadair et al., Aug. 27, 2020.

According to this technique, the operator (Internet service provider for example) may add his DNS server(s) to the list of authorised servers. The DNS server of the operator with which a secure connection is established, also called a DoH server, or another partner server, is announced by the CPE in the LAN. A domain name and a certificate are then generated by the operator for the CPEs which embed a "DNS forwarder".

Figure 3:
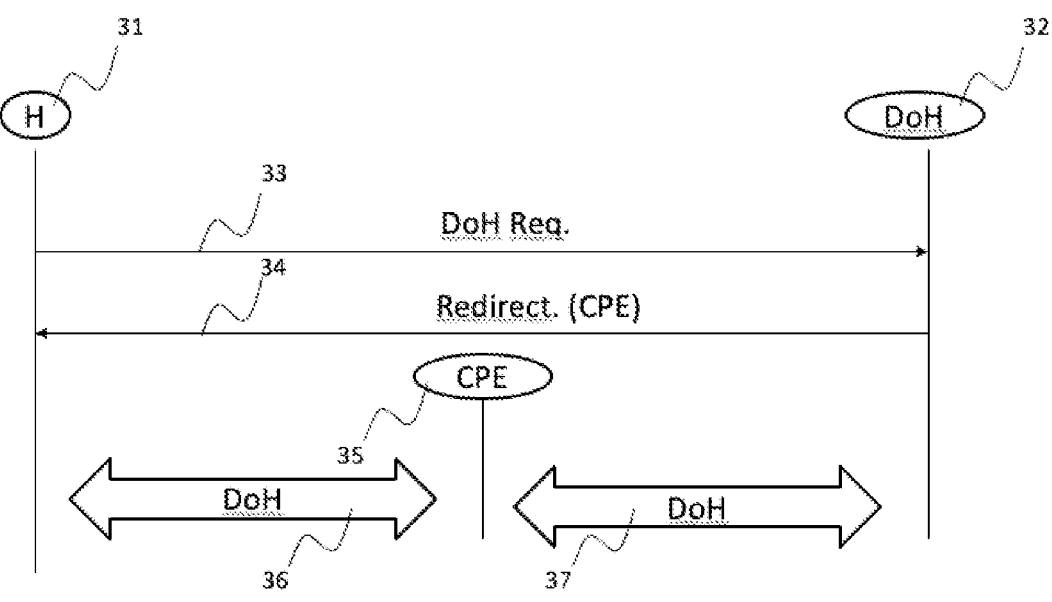

As illustrated in FIG. 3, a DoH client (for example embedded in a terminal 31 connected on the LAN) implements an automatic update procedure for its Do53 connection by connecting to the announced DoH server 32. To do so, the DoH client sends a DoH request 33 to the DoH server 32.

The DoH server 32 returns a redirection message 34 in response to the request of the client asking him to establish a DoH connection with the CPE 35 hosting the "DNS forwarder". The DoH server 32 communicates to the client the identifier to be used for authentication purposes (for example, PKIX authentication standing for "Public-Key Infrastructure using X.509") as well as the address(es) to join the "DNS forwarder" of the CPE 35. Other information may also be returned (for example a port number).

An example of a JSON ("JavaScript Object Notation") object returned by the DoH server 32 of the operator is given in the appendix.

Upon receipt of the redirection message 34, the client 31 establishes a DoH session 36 with the CPE 35 using the information thus retrieved. The CPE 35 maintains a DoH session 37 with the DoH server 32 of the operator. In particular, this session may be used to serve the requests that cannot be processed locally by the local "DNS forwarder" embedded in the CPE 35, in this example.

However, maintaining this DoH connection is not enough to minimise the risk of hacking the DNS request sent by the client/terminal. Indeed, the mechanism does not allow detecting the presence of malicious servers, particularly in the LAN. For example, a malicious server may usurp the IP address of the CPE and thus intercept the DoH requests sent by a terminal of the LAN. The malicious server may also block the messages sent by the CPE.

Figure 4A:
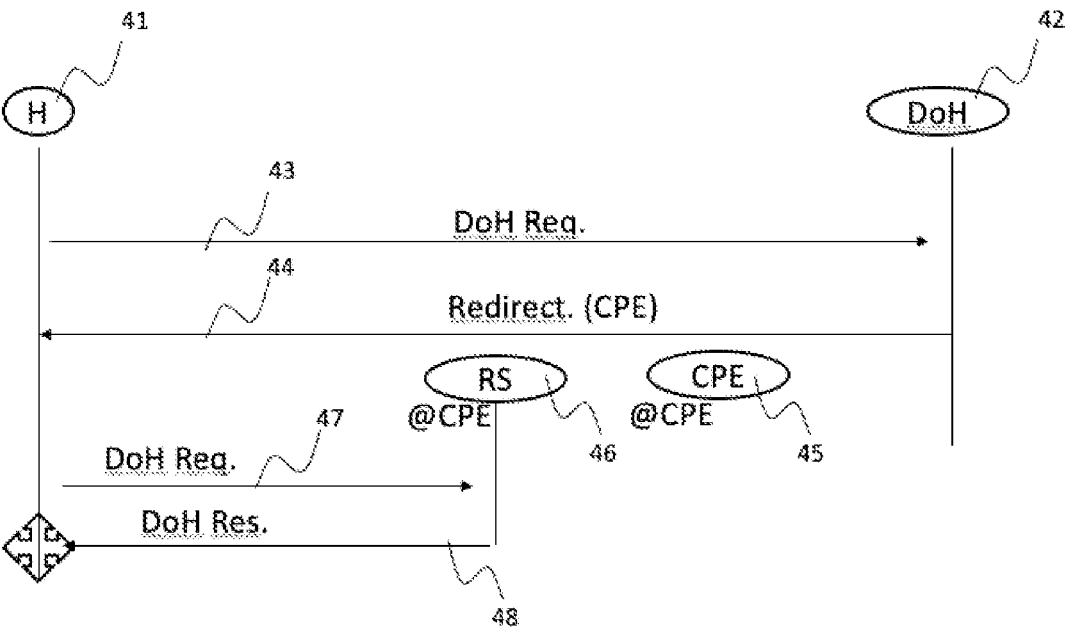

Thus, as illustrated in FIG. 4A, a terminal 41 may send a DoH request 43 to a DoH server 42 of the operator, and receive a redirection message 44 in response, communicating to the terminal 41 the identifier to be used for the purposes of PKIX authentication as well as the address(es) to reach the legitimate CPE 45. In the event that a malicious server 46 has usurped the IP address (@CPE) of the CPE 45, the terminal 41 tries to establish a session with the malicious server 46, by sending a DoH request 47. Nonetheless, the responses 48 sent by the malicious server 46 are rejected by the terminal 41 because the PKIX authentication fails, and the terminal 41 cannot access the service. If the terminal 41 tries to connect to the DoH server 42 of the operator while ignoring the redirection instruction, the DoH server 42 will systematically send a redirection message similar to the previously-described message 44, communicating to the terminal 41 the identifier to be used for PKIX authentication purposes as well as the address(es) to reach the legitimate CPE 45.

Hence, a drawback of such a technique according to the prior art is the risk of unavailability of the connectivity service, including the local services (i.e., the services offered thanks to the presence of the "DNS forwarder" in the CPEs).

Figure 4B:
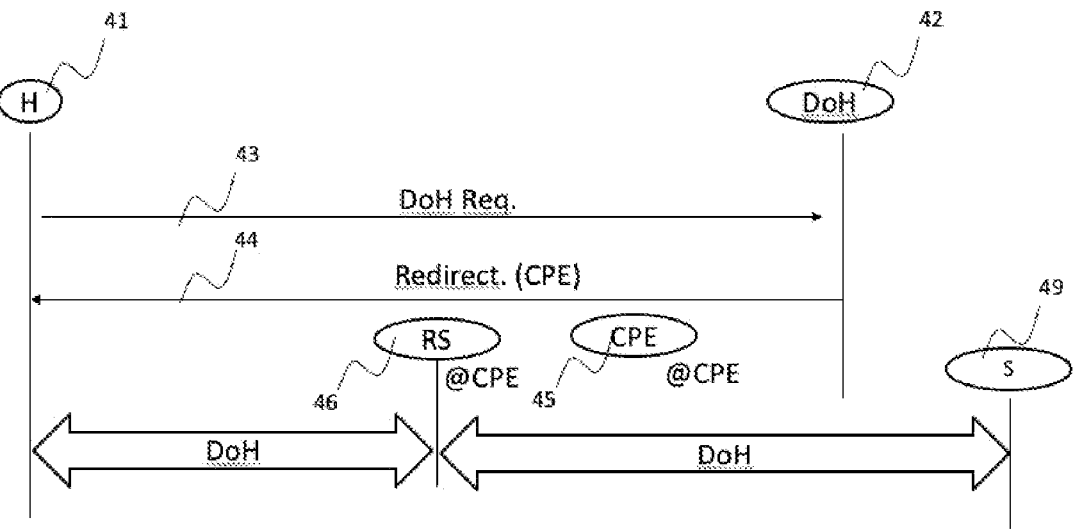

Indeed, if, as illustrated in FIG. 4B, the malicious server 46 succeeds in acquiring the authentication identifiers used by the CPE 45, a secure connection may be established between the terminal 41 and the malicious server 46, and the malicious server 46 and a remote server 49. Despite the existence of such a secure connection, the malicious server 46 might recover all of the DNS requests transmitted by the terminal 41, and possibly the personal data of the user of the terminal.

Hence, establishing a secure connection is not enough to guarantee the legitimacy of the server with which this connection is established.

Hence, the activation of protocols such as DoH (application layer protocol) or DoT (transport layer protocol, as described in the document RFC 7858-"Specification for DNS over Transport Layer Security (TLS)" Z. Hu et al., May 2016) does not solve the aforementioned problem of security of the mechanisms for discovering legitimate DNS servers within a LAN network.

Hence, there is a need for a new solution allowing guaranteeing the continuity of service based on the DNS service and preserving the security of the communications of the users, while offering value-added services and guaranteeing the legitimacy of the DNS servers to which these users transmit name resolution requests.

3. DISCLOSURE OF THE INVENTION

The invention suggests different methods for redirecting a DNS traffic from a DNS client, implemented in different entities, allowing securely redirecting the traffic from a first name resolution server to a second name resolution server, when a redirection procedure is activated and authorised for this DNS client.

It should be noted that several DNS clients could be activated in the same terminal. In this case, the solution described hereinbelow may be implemented independently for each DNS client wishing to activate it. Nonetheless, next, the terms "DNS client" and "terminal" are used interchangeably.

Thus, the invention provides a name resolution method, implemented in a terminal connected to a communication network, comprising:

transmitting, to a first name resolution server, a name resolution message via a secure communication channel between said terminal and said first name resolution server, for example by relying on protocols of the application layer (for example HTTPS) or of the transport layer (for example QUIC/UDP), if a redirection of the DNS traffic of the terminal is authorised (for example authorised by default for the terminal or authorised by a distinct entity, for example an authorisation server), obtaining at least one identifier of a second name resolution server for said redirection, executing at least one action for managing said redirection of the DNS traffic of the terminal to the second name resolution server, at least from among:

verifying the legitimacy of said second name resolution server, sending an indication of a failure of a connection of the terminal with said second name resolution server, requesting the deactivation of said redirection of the DNS traffic to said second name resolution server.

Thus, the proposed solution allows implementing different actions following or concomitantly with obtaining one or more identifier(s) of a second name resolution server, such as a procedure for verifying the legitimacy of the second name resolution server, a procedure allowing overcoming an authentication problem of the second name resolution server (for example a procedure for generating at least one new identifier for the second name resolution server), a procedure for deactivating the redirection, etc.

Thus, the proposed solution offers a solution for preserving the continuity of service relying on the DNS service and/or the security of communications.

In particular, such a management action may be specified in the header or the body of the name resolution message emitted by the terminal. In this way, upon receipt of the name resolution message, the first server may determine the procedure to implement.

For example, a name resolution message of the DoH GET(fwd-check) or DoH POST(fwd-check) type may be emitted to initiate an action such as verifying the legitimacy of the second name resolution server. A name resolution message of the DoH GET(redirect-auth-failed) or DoH POST(redirect-auth-failed) type may be emitted to initiate an action such as sending an indication of a failure of a connection of the terminal with the second name resolution server. A name resolution message of the DoH GET(rd-disable) or POST(rd-disable) type may be sent to initiate an action such as requesting deactivation of said redirection of the DNS traffic to said second name resolution server. In particular, an indication of a failure of a connection of the terminal with said second name resolution server may consists in signalling the failure of the connection or an explicit indication to generate a new identifier.

In particular, the second server may be added to a list of authorised ("accepted") servers for the DNS traffic redirection service. The terminal may then proceed with a migration from an unsecure connection to a secure connection with this second server, and with a redirection of the DNS traffic to this second server using the secure communication channel. If the verification of the legitimacy of the second server fails, it is possible to suppress (or not add) this second server from the list of authorised servers. Redirection to this second server may then be deactivated by the terminal.

For example, said at least one identifier of the second name resolution server belongs to the group comprising: a domain name identifying the second server, an address for joining the second server, etc.

As indicated before, an action for managing the redirection of the DNS traffic of the terminal comprises for example sending an indication of a failure of a connection of the terminal with said second name resolution server. For example, such an action further results in obtaining a new identifier of the second name resolution server.

In this way, when the terminal has failed to authenticate the second name resolution server, it may trigger an action allowing obtaining a new identifier of the second server.

Another action for managing the redirection of the DNS traffic consists in verifying the legitimacy of the second name resolution server. For example, such an action comprises:

receiving at least one piece of information for verifying the legitimacy of said second name resolution server, originating from said first name resolution server,
    verifying the legitimacy of an entity emitting a response to a name resolution request, emitted by the terminal using said at least one identifier of the second server and generated from said at least one verification piece of information, by comparing said response with a test response obtained from said at least one verification piece of information.

Still another action for managing the redirection of the DNS traffic of the terminal is the request to deactivate the redirection of the DNS traffic to said second name resolution server. In particular, such an action may be executed following another action, for example when the verification of the legitimacy of the second server has failed or after one or more failure(s) of connection of the terminal to the second server, despite the generation of at least one new identifier of the second server.

The invention also relates to a method for controlling a redirection of a DNS traffic authorised for a terminal in a communication network, said terminal having emitted a name resolution message via a secure communication channel between said terminal and a first name resolution server.

Such a control method is implemented in a network controller, also called an orchestrator, and comprises:

exchanging information with a second name resolution server identified for the terminal for said authorised redirection of the DNS traffic of the terminal, said information comprising at least one piece of information, provided by the controller to the second name resolution server, for verifying by said terminal the legitimacy of the second name resolution server and/or at least one piece of information, provided by the second name resolution server to the controller, for the resolution of a failure of a connection of the terminal with the second name resolution server.

In particular, such a control method may be implemented to assist the terminal in the execution of an action for managing the redirection of the DNS traffic, in particular an action such as sending an indication of a failure of a connection of the terminal with said second name resolution server or an action such as verifying the legitimacy of the second name resolution server.

The first name resolution server and the network controller may form the same entity, or belong to distinct entities.

In this second case, the first name resolution server and the network controller may exchange messages to communicate.

In particular, such a controller may have at least one identifier of the second name resolution server if the second server is a default router defined for the communication network, for example a CPE. Alternatively, the controller implements the obtainment of at least one identifier of the second name resolution server originating from an authorisation server of the network.

According to a particular embodiment, at least one of said information provided by the second name resolution server for the resolution of a failure of a connection of the terminal with the second name resolution server comprises at least one new identifier of said second name resolution server.

Alternatively, the method implemented by the controller comprises obtaining, from a default router defined for the communication network, at least one new identifier of said second name resolution server.

In both cases, the controller may transmit said at least one new identifier to an authorisation server of the network.

In particular, such actions may be implemented when the terminal executes an action for managing the redirection of the terminal such as sending an indication of a failure of a connection of the terminal with said second name resolution server.

According to a particular embodiment, the method implemented by the controller comprises, during said information exchange, transmitting to said second name resolution server at least one identifier of said terminal authorised to verify the legitimacy of the second name resolution server, or at least one identifier of a network to which said terminal belongs.

In particular, such an action may be implemented when the terminal executes an action such as verifying the legitimacy of the second server.

In this way, the controller may inform the second name resolution server of the terminal(s) authorised to verify the legitimacy of the second name resolution server.

For example, said at least one identifier of the terminal belongs to the group comprising: an IPv4/IPv6 address, an IPv4/IPv6 prefix, a DNS-ID identifier of a certificate of the terminal or any other identifier entered in the "Subject Alternative Name" field of the certificate (as described in the document Internet X.509 Public Key Infrastructure Certificate and Certificate Revocation List (CRL) Profile, D. Cooper et al., May 2008), etc.

The invention also relates to a method for managing a DNS traffic redirection authorised for a terminal in a communication network, said terminal having emitted a name resolution message via a secure communication channel between said terminal and a first name resolution server.

Such a management method is implemented in a second name resolution server of said network identified for the terminal for said redirection, and comprises:

exchanging information with a controller of the network, said information comprising at least one piece of information, provided by the controller to the second name resolution server, for verifying by said terminal the legitimacy of the second name resolution server and/or at least one piece of information, provided by the second name resolution server to the controller, for the resolution of a failure of a connection of the terminal with the second name resolution server.

In particular, such a management method may be implemented to assist the terminal in the execution of an action for managing the redirection of the DNS traffic.

In particular, the management method comprises transmitting to said terminal a response to a name resolution request, said response carrying a test response obtained from at least one identifier of the terminal and said at least one piece of information for verifying the legitimacy of said second name resolution server obtained during the exchange with the controller.

In particular, the name resolution request may be a test request, generated from said at least one verification piece of information.

In particular, such an action may be implemented when the terminal executes an action such as verifying the legitimacy of the second server.

According to another embodiment, the management method comprises:

generating at least one new identifier of said second name resolution server,
    transmitting, to said network controller, said at least one new identifier during the exchange with said controller.

In particular, such actions may be implemented when the terminal executes an action for managing the redirection of the terminal such as sending an indication of a failure of a connection of the terminal with said second name resolution server.

The invention also relates to a method for processing a redirection of a DNS traffic authorised for a terminal in a communication network, implemented in a first name resolution server of said network, comprising:

receiving a name resolution message from said terminal, received via a secure communication channel between said terminal and said first name resolution server,
    obtaining, from an authorisation server, a redirection authorisation for said terminal and at least one identifier of a second name resolution server identified for said terminal for said redirection, and
    transmitting, to said terminal, a redirection message bearing said at least one identifier of a second name resolution server.

The first name resolution server communicates on the one hand with the terminal via a secure communication channel, and on the other hand with an authorisation server able to communicate with a network controller, itself able to communicate with the second name resolution server. The first name resolution server and the authorisation server may form the same entity, or belong to distinct entities. In this second case, the first name resolution server and the authorisation server may exchange messages to communicate.

For example, if said first name resolution server and said authorisation server belong to distinct entities, obtaining a redirection authorisation for the terminal and at least one identifier of a second name resolution server names identified for said terminal implements:

transmitting, to the authorisation server, a redirection authorisation verification request bearing at least one identifier of said terminal,
    receiving the redirection authorisation for the terminal from said authorisation server and said at least one identifier of a second name resolution server identified for the terminal for said redirection.

According to a first embodiment, the first name resolution server implements:

obtaining at least one piece of information for verifying the legitimacy of said second name resolution server (originating from an authorisation server or generated by the first name resolution server), and
    transmitting to said terminal said at least one verification piece of information.

In particular, such steps may be implemented when the terminal executes an action such as the verification of the legitimacy of the second server, so that the first server could obtain at least one verification piece of information.

According to a first variant, obtaining at least one verification piece of information implements the generation of at least one verification test by the first name resolution server and the transmission of said at least one verification test to said authorisation server.

Thus, the first server generates at least one verification test (for example it generates a domain name and the associated DNS entry), and transmits the test(s) on the one hand to the authorisation server (for example in the redirection authorisation verification request or in an "Accounting-Request" message) and on the other hand to the terminal (for example in the "DoH 3xx" redirection message).

According to a second variant, obtaining at least one verification piece of information implements the reception of at least one verification test originating from said authorisation server.

In this case, the first server transmits the test(s) only to the terminal (for example in the "DoH 3xx" redirection message). It is not necessary to transmit the test(s) to the authorisation server since it has generated them itself.

According to a second embodiment, the first name resolution server implements:

obtaining, from said authorisation server, at least one new identifier of said second name resolution server,
    transmitting to said terminal said at least one new identifier of said second name resolution server.

In particular, such steps may be implemented when the terminal executes an action such as sending an indication of a failure of a connection of the terminal with said second name resolution server, so that the first server could obtain at least one new identifier of said second name resolution server.

For example, if said first name resolution server and said authorisation server belong to distinct entities, obtaining at least one new identifier of said second name resolution server implements:

transmitting, to said authorisation server, a request for generating at least one new identifier of said second name resolution server,
    receiving, from said authorisation server, at least one new identifier of said second name resolution server.

If the procedure to be set up consists in generating at least one new identifier of the second name resolution server, the first server may contact the authorisation server to obtain at least one new identifier of said second name resolution server, by sending thereto a request to generate at least one new identifier. For example, such a request is transmitted in the redirection authorisation verification request or in an "Accounting-Request" message.

Thus, the first server may receive at least one new identifier of the second server and transmit it to the terminal (for example in the "DoH 3xx" redirection message).

According to another embodiment, the first name resolution server may proceed with the deactivation of the DNS traffic redirection to said second name resolution server following at least one failure of a connection of the terminal with said second name resolution, or the deactivation of the DNS traffic redirection to a third name resolution server designated by default for the terminal upon request of said terminal.

In particular, such steps may be implemented if the terminal executes an action such as requesting the deactivation of the redirection of the DNS traffic to said second name resolution server.

Triggering the deactivation of the redirection may also be implemented upon request of the terminal. In particular, the deactivation of the redirection may be decided (by the terminal or by the first server, for example) after N authentication failures, with N an integer greater than or equal to 1, for example equal to 3.

In particular, the first name resolution server may deactivate the redirection of a DNS traffic redirection to a name resolution server designated by default (third name resolution server), and therefore not designated by the authorisation server.

According to a first variant, the first asks for authorisation from the authorisation server before proceeding with the deactivation of the redirection. For example, the first name resolution server implements:

transmitting, to the authorisation server, a request for deactivation of the redirection to said second name resolution server, receiving a deactivation authorisation, originating from said authorisation server.

According to a second variant, the first server decides to deactivate redirection to the second server, and informs the authorisation server thereof. For example, the first name resolution server implements:

transmitting, to said authorisation server, a piece of information according to which redirection to said second name resolution server is deactivated.

The invention also relates to a method for authorising a redirection of a DNS traffic of a terminal in a communication network, implemented in an authorisation server of said network, said terminal having emitted a name resolution message via a secure communication channel between said terminal and a first name resolution server.

Such an authorisation method comprises, if a redirection of the DNS traffic of the terminal is authorised:

obtaining at least one identifier of a second name resolution server identified for said terminal for said redirection, and transmitting, to said first name resolution server, a redirection authorisation for said terminal and said at least one identifier of a second name resolution server.

In particular, the use of such an authorisation server allows improving the reliability of the different procedures/actions, in particular for verifying the legitimacy of the second server or for solving the authentication problems.

In particular, such steps are implemented following the reception of a redirection authorisation verification request originating from the first name resolution server.

According to a particular embodiment, such an authorisation method comprises transmitting, to a controller of said network, at least one element belonging to the group comprising:

at least one identifier of said terminal, at least one identifier of a network to which said terminal belongs, said at least one identifier of said second name resolution server, at least one piece of information for verifying the legitimacy of said second name resolution server.

In particular, the authorisation method may implement the obtainment of at least one piece of information for verifying the legitimacy of said second name resolution server prior to the transmission of said piece of information for verifying the legitimacy of the controller.

In particular, this step may be implemented when the terminal executes an action such as verifying the legitimacy of the second name resolution server, so that the authorisation server could obtain at least one piece of information for verifying the legitimacy of said second name resolution server.

For example, obtaining at least one verification piece of information implements the reception of at least one verification test from said first name resolution server (generation of a test request by the first name resolution server). Alternatively, obtaining at least one verification piece of information implements the generation of at least one verification test by the authorisation server and the transmission of said at least one verification test to said first name resolution server (generation of a test request by the authorisation server).

According to another embodiment, the authorisation method comprises:

obtaining, from said network controller, at least one new identifier of said second name resolution server, transmitting, to said first name resolution server, said at least one new identifier of said second name resolution server.

In particular, such steps may be implemented when the terminal executes an action such as sending an indication of a failure of a connection of the terminal with said second name resolution server, so that the authorisation server could obtain at least one new identifier of the second name resolution server.

In other embodiments, the invention also relates to a corresponding terminal, a network controller, a first name resolution server, a second name resolution server and a corresponding authorisation server.

Some of these entities may form the same entity (for example the first name resolution server and/or the authorisation server and/or the controller may be co-located). In this case, different modules (for example a module associated with the first name resolution server, a module associated with the authorisation server, a module associated with the network controller) may communicate within the same entity, for example by exchanging messages.

Moreover, the invention relates to a system for redirecting a DNS traffic in a communication network comprising a terminal, a network controller, a first name resolution server, a second name resolution server and a corresponding authorisation server.

In another embodiment, the invention relates to one or more computer program(s) including instructions for the implementation of at least one method according to at least one embodiment of the invention, when this or these program(s) is/are executed by a processor.

Hence, the methods according to the invention may be implemented in various manners, in particular in wired form and/or in software form.

In particular, some steps may be implemented by a generic module, an application, a DNS resolver ("resolver" or "stub-resolver"), etc. These different modules may be embedded in a CPE, a terminal ("User Equipment"), a key equipped for example with a USB port ("(USB) dongle"), etc.

4. LIST OF THE FIGURES

Other features and advantages of the invention will appear more clearly upon reading the following description of a

Figure 5A:
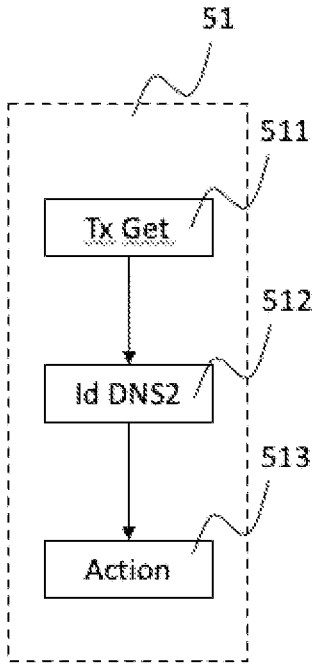
Figure 5B:
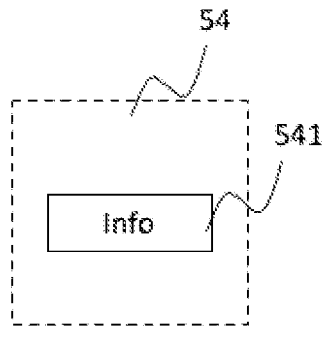
Figure 5C:
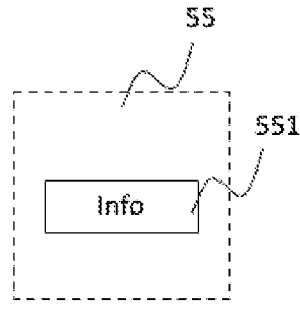
Figure 5D:
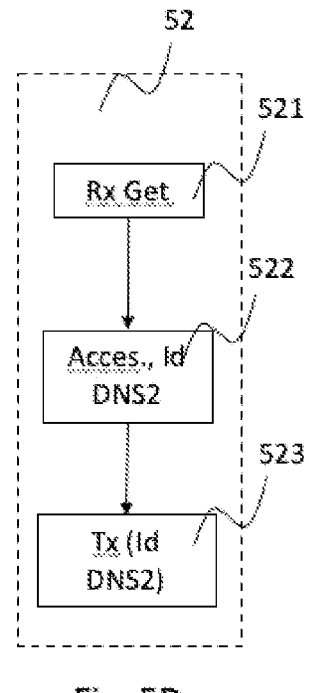
Figure 5E:
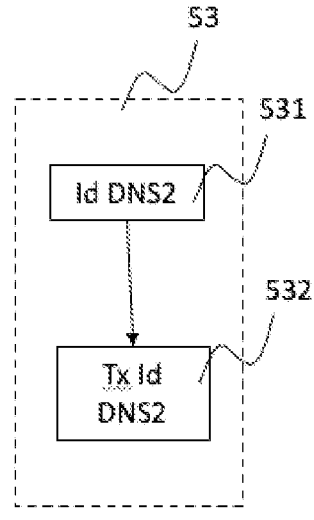
Figure 6:
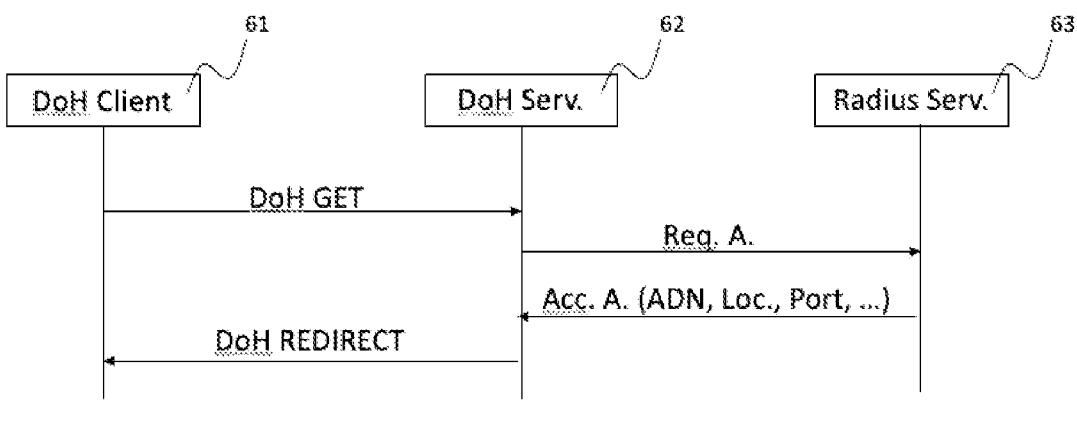
Figure 7A:
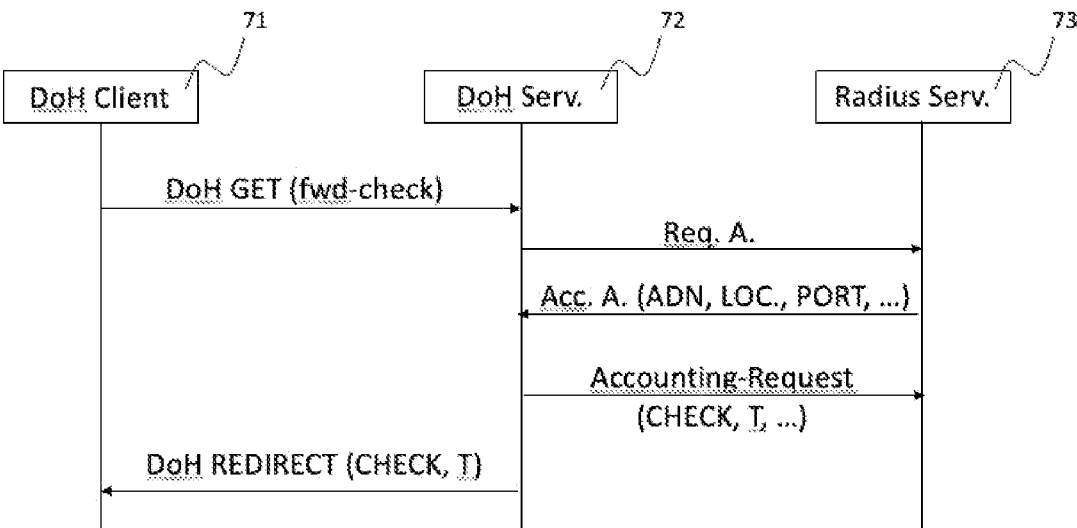
Figure 7B:
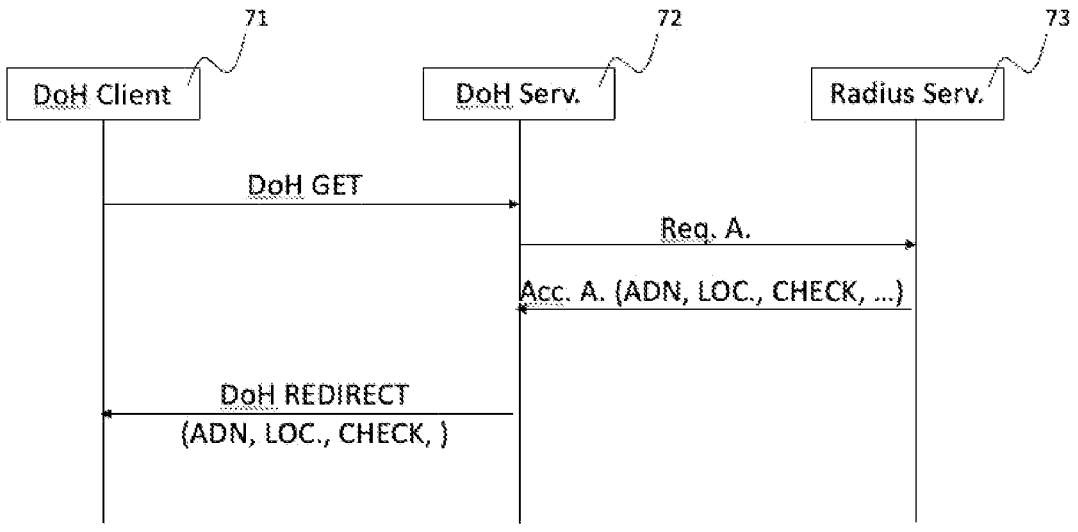
Figure 8:
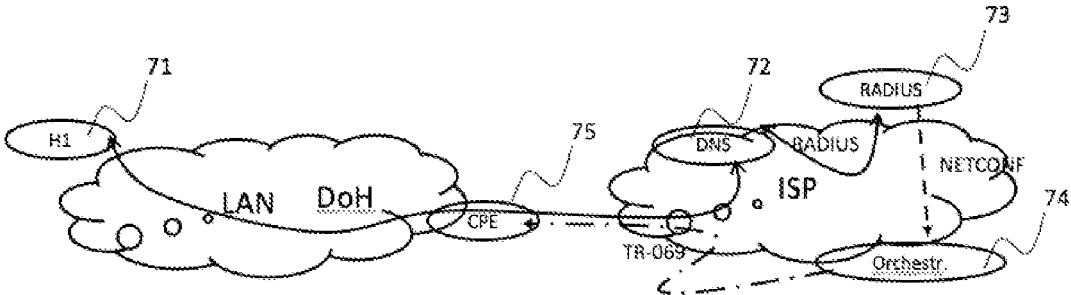
Figure 9A:
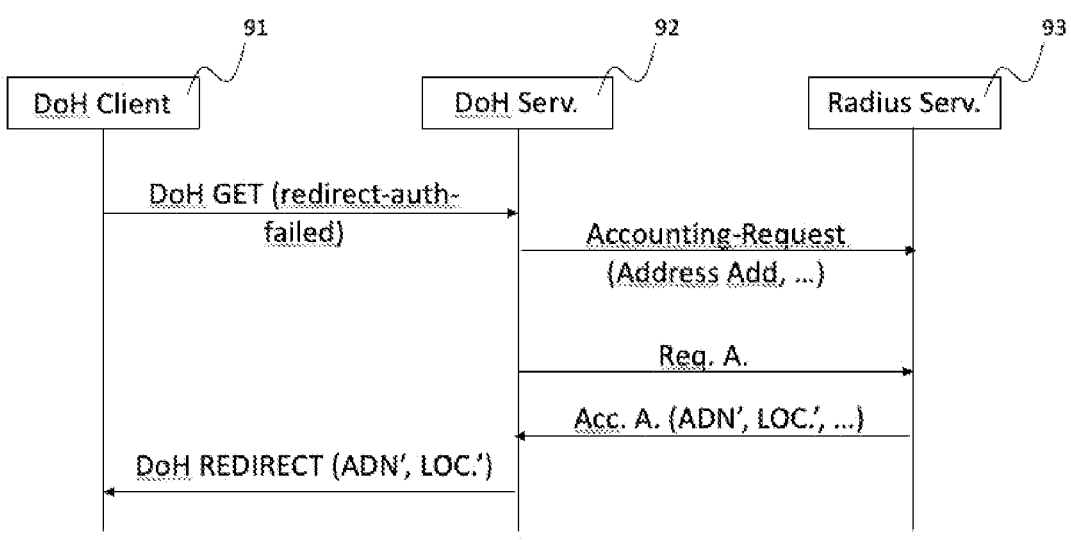
Figure 9B:
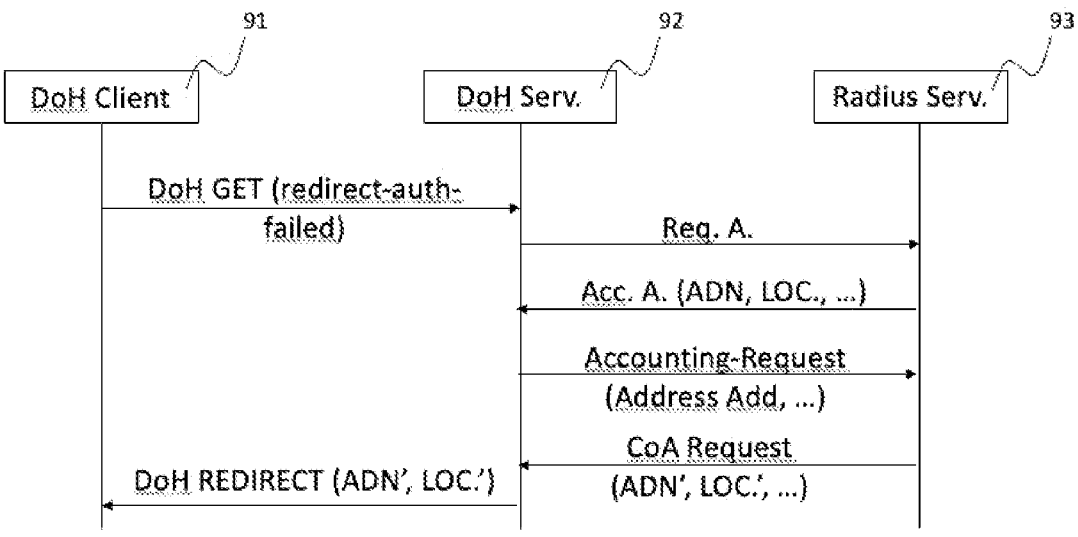
Figure 10A:
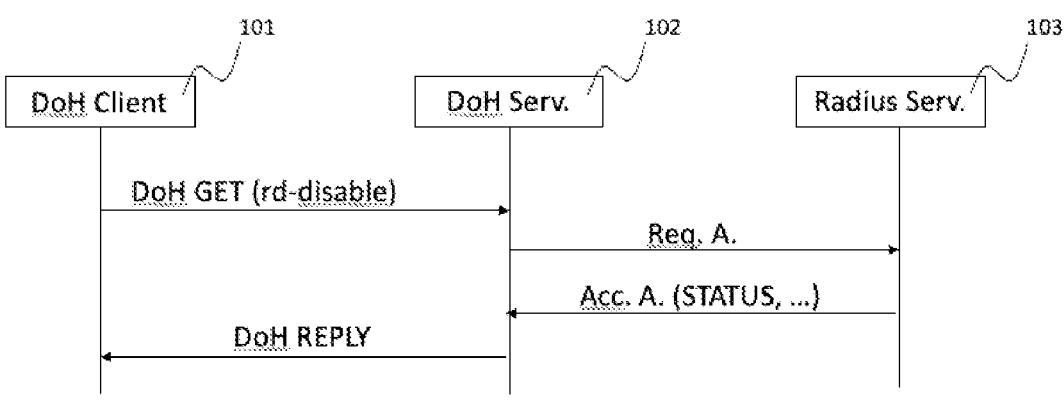
Figure 10B:
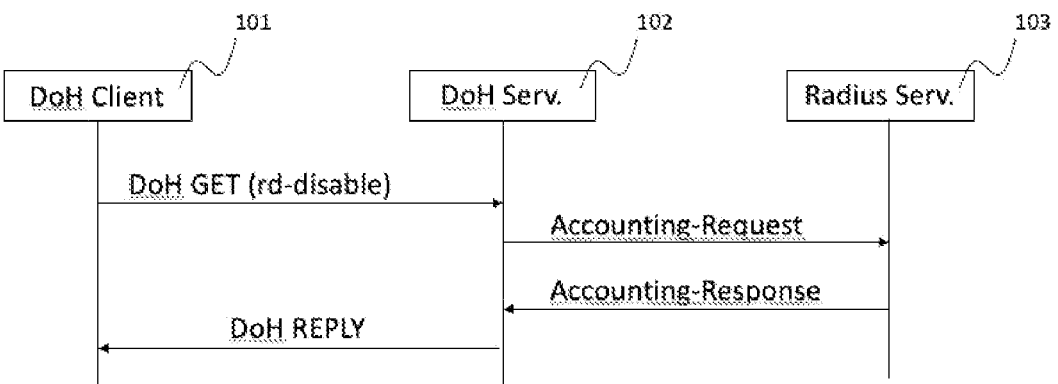
Figure 11:
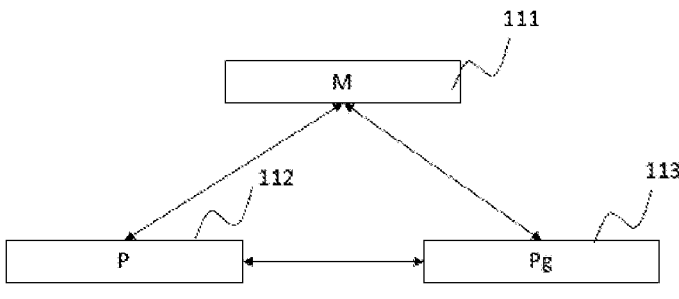

13 particular embodiment, given as a simple illustrative and non-limiting example, and from the appended drawings, wherein:

FIG. 1A, discussed in relation to the prior art, illustrates an example of deployment of a DNS service without any relay ("DNS forwarder") embedded in the CPE, FIG. 1B, discussed in relation to the prior art, illustrates an example of deployment of a DNS service with DNS relay embedded in the CPE, FIG. 1C, discussed in relation to the prior art, illustrates an example of establishment of a connection with a remote server, FIG. 2, also discussed in relation to the prior art, illustrates an example of interception of the DNS requests by malicious equipment, FIG. 3 illustrates a procedure for automatically updating the DNS connection according to the prior art, FIG. 4A and FIG. 4B, also discussed in relation to the prior art, illustrate examples of problems encountered during the procedure for automatically updating the Do53 connection into an encrypted DNS connection according to the prior art, FIG. 5A, FIG. 53, FIG. 5C, FIG. 5D and FIG. 5E show the main steps implemented for the management of a redirection of the DNS traffic according to at least one embodiment of the invention, FIG. 6 illustrates an example of the messages exchanged between a terminal, a first name resolution server and an authorisation server, FIG. 7A and FIG. 7B illustrate an example of the messages exchanged between a terminal, a first name resolution server and an authorisation server according to a first embodiment, FIG. 8 shows the different entities involved in the traffic redirection according to at least one embodiment of the invention, FIG. 9A and FIG. 9B illustrate an example of the messages exchanged between a terminal, a first name resolution server and an authorisation server according to a second embodiment, FIG. 10A and FIG. 10B illustrate an example of the messages exchanged between a terminal, a first name resolution server and an authorisation server for the deactivation of a traffic redirection procedure according to at least one embodiment of the invention, FIG. 11 shows the simplified structure of the different entities according to a particular embodiment.

5. DESCRIPTION OF AN EMBODIMENT OF THE INVENTION

5.1 General Principle

The invention suggests a secure solution for managing the redirection of the DNS traffic of a terminal, from a first name resolution server to a second name resolution server identified for the terminal for redirection.

To do so, it is considered that a terminal could send name resolution requests to a first name resolution server using a secure channel, and that the first name resolution server wishes to set up a procedure for redirecting the DNS traffic to a second name resolution server identified for the terminal for redirection.

The general principle of the invention is based on the execution, by the terminal, of at least one action for managing the redirection of the DNS traffic of the terminal to the second server identified for the terminal for redirection. For example, such an action consists in verifying the legitimacy of the second name resolution server, sending an indication of a failure of a connection of the terminal with the second name resolution server, asking for the deactivation of the DNS traffic redirection to the second name resolution server, etc.

Thus, the suggested solution allows detecting, avoiding and/or correcting the identity usurpation or authentication problems as described with reference to FIGS. 4A and 4B, which might prevent a terminal from accessing services that rely on the DNS service (specifically, the encrypted DNS service ("encrypted DNS")).

Referring to FIGS. 5A to 5F, the main steps implemented according to the invention are presented in a system comprising a terminal 51, a first name resolution server 52, an authorisation server 53, a network 54, and a second name resolution server 55.

For example, a local area network is considered connected to the network of an operator by a router, for example a CPE, and the first name resolution server 52 belongs to the network of the operator and the terminal 51 to the local area network.

Of course, other contexts may be considered. For example, the first name resolution server may be a legitimate server in the network of the operator which redirects the DNS traffic to at least one second name resolution server in the network of the operator or another network closer to the terminal.

Hence, the terminal and the second name resolution server are not necessarily attached to the same network, and the redirection is not necessarily implemented to a server of the local area network. Similarly, the first name resolution server may be attached to a network distinct from the access network.

Thus, next, by "communication network", it should be understood a set comprising one or more network(s) to which the terminal 51, the first name resolution server 52 and the second name resolution server 55 are attached. Other entities that might intervene in the management of the redirection of the DNS traffic may also be attached to this or these network(s), in particular an authorisation server 53, allowing in particular verifying whether the redirection is authorised for the terminal, and possibly a network controller 54. Each of these entities may be attached to a network distinct from the communication network. Nonetheless, the different entities may communicate with each other, at least in pairs.

As illustrated in FIG. 5A, during a step 511, the terminal 51 transmits, to the first name resolution server 52, at least one name resolution message via a secure communication channel between the terminal 51 and the first name resolution server 52.

If a redirection of the DNS traffic of the terminal is authorised, the terminal 51 obtains 512 at least one identifier of a legitimate second name resolution server 55 for the redirection, originating from the first name resolution server 52 or from an entity in direct or indirect communication with the first name resolution server 52 (for example an authorisation server 53 or a network controller 54).

The terminal 51 may then execute 513 at least one action for managing said redirection of the DNS traffic of the terminal to the second name resolution server 55, at least from among:

verifying the legitimacy of the second name resolution server, sending an indication of a failure of a connection of the terminal with the second name resolution server, requesting the deactivation of the redirection of the DNS traffic to the second name resolution server.

In particular, to verify the legitimacy of the second name resolution server, the terminal 51 may emit a name resolution request to the entity identified from said at least one identifier included in the redirection message (i.e., the second server name resolution, if its identity is not usurped by another entity), as described later on.

As illustrated in FIG. 53, if a redirection of the DNS traffic of the terminal is authorised, the network controller 54 may in particular exchange 541 information with the second name resolution server 55 identified for the terminal for the authorised redirection of the DNS traffic of the terminal, to assist the terminal 51 in the execution of the DNS traffic redirection management actions.

For example, the controller 54 may provide the second name resolution server 55 with at least one piece of information for verifying, by the terminal 51, the legitimacy of the second name resolution server 55. Moreover, the controller 54 may obtain, from the second name resolution server, at least one piece of information for the resolution of a failure of a connection of the terminal with the second name resolution server, for example a new identifier of the second name resolution server.

Similarly, if a redirection of the DNS traffic of the terminal is authorised, the second name resolution server 55, illustrated in FIG. 5C, may exchange 551 information with the network controller 54, to assist the terminal 51 in the execution of the DNS traffic redirection management actions.

For example, the second name resolution server 55 may obtain, from the controller 54, at least one piece of information for verifying, by the terminal 51, the legitimacy of the second name resolution server 55. The second name resolution server 55 may also provide the network controller 54 with at least one piece of information for the resolution of a failure of a connection of the terminal with the second name resolution server.

FIG. 5D illustrates the main steps implemented in the first name resolution server 52.

As illustrated in FIG. 5D, upon receipt 521 of the name resolution message from the terminal 51, the first name resolution server 52 may in particular verify whether a redirection of the DNS traffic of the terminal is authorised, for example by consulting the server authorisation 53. The authorisation server 53 may also communicate with the network controller 54.

For example, the first name resolution server 52 may transmit, to the authorisation server 53, a redirection-type service authorisation verification request, including at least an identifier of the terminal 51 or an identifier of the network to which the terminal 51 is connected.

The case where the service is of the redirection type is described herein. In other embodiments, the authorisation server may verify whether the terminal is authorised to use a DNS profile identified in the name resolution message. Indeed, several DoH profiles (identified by "URI Templates") may be supported by the same name resolution server. Each of these profiles may be configured to provide a different DNS service (with or without filtering, anti-spam activated, etc.).

Thus, the first name resolution server 52 may obtain 522 a redirection authorisation for the terminal and at least one identifier of a second legitimate name resolution server identified for the terminal 51 for redirection and transmit

523, to the terminal 51, a redirection message bearing said at least one identifier of a second legitimate name resolution server.

As illustrated in FIG. 5E, the authorisation server 53 may in particular obtain 531 at least one identifier from the legitimate second name resolution server 55 identified for the terminal 51 for redirection, for example upon receipt of a redirection-type service authorisation verification request from the first resolution server 52.

In particular, the authorisation server 53, after verifications based on the identifier(s) of the terminal and on local instructions (i.e., instructions from the operator of the authorisation server (for example default redirection or for a particular identifier)), obtains 531, where applicable, at least one identifier of a second name resolution server 55 associated with the terminal 51 identified from the identifier(s) of the terminal 51.

Afterwards, the authorisation server 53 may transmit 532 to the first name resolution server 52, a redirection authorisation for the terminal 51 and at least one identifier of a second name resolution server 55.

As indicated hereinabove, these different entities may in particular assist the terminal 51 in the execution of at least one action for managing the redirection of the DNS traffic of the terminal to the second name resolution server 55.

A first embodiment is described hereinafter according to which the DNS traffic redirection management action consists in verifying the legitimacy of the second name resolution server.

According to this first embodiment, the invention proposes a solution allowing detecting whether the entity presenting itself as being the second name resolution server 55 is malicious. In particular, it is possible to interrupt the redirection of the traffic in the event of the confirmed presence of a malicious entity. To do so, a test procedure may be implemented.

For example, according to this first embodiment, the execution of an action like verifying the legitimacy of the second name resolution server comprises the transmission, by the terminal 51 to the first name resolution server 52, of an indicator requiring the verification of the legitimacy of the second name resolution server. For example, such an indicator may be inserted in the body or the header of the name resolution message transmitted from the terminal 51 to the first name resolution server 52 during step 511, or in another message.

Upon receipt of the indicator requesting the verification of the legitimacy of the second name resolution server, the first name resolution server 52 generates at least one piece of information for verifying the legitimacy of the second name resolution server, or asks the authorisation server 53 to obtain such information.

Thus, the first name resolution server 52 may transmit to the terminal 51 the information(s) for verifying the legitimacy of the second name resolution server, for example in the redirection message.

In addition, if the first name resolution server 52 has generated the information(s) for verifying the legitimacy of the second name resolution server, these informations may be transmitted to the authorisation server 53, then from the authorisation server 53 to the network controller 54, then from the network controller 54 to the legitimate second name resolution server 55.

If the first name resolution server 52 has received the information(s) for verifying the legitimacy of the second name resolution server from the authorisation server 53, these informations is directly transmitted from the authorisation server 53 to the network controller 54, then from the network controller 54 to the legitimate second name resolution server 55.

Alternatively, the first name resolution server may communicate directly with the legitimate second name resolution server 55.

Thus, both the terminal 51 and the legitimate second name resolution server 55 have the same information for verifying the legitimacy of the second name resolution server. For example, such information comprises one or more verification test(s), formed by at least one DNS request and the corresponding response.

Thus, the terminal 51 may emit a test-request to the entity identified from the redirection message, constructed from the verification test(s) included in the redirection message.

The terminal 51 may then verify the legitimacy of the entity identified from the redirection message by comparing the response received from this entity with a test response obtained by the terminal 51 from the verification test(s) included in the redirection message.

In particular, if no response is received by the terminal 51, or if a response is presented but does not correspond to that one communicated by the first name resolution server 52 in the verification information, the terminal 51 may conclude that the entity identified from the redirection message, and presenting itself as being the second name resolution server 55, is malicious.

Moreover, the network controller 54 may have obtained beforehand the identifier(s) of the terminal 51, from the authorisation server 53, and have transmitted them to the legitimate second name resolution server 55.

Upon receipt of a name resolution request, the legitimate second name resolution server 55 may thus verify whether at least one identifier of the entity emitting a name resolution request is identical to or correlated with the identifier(s) of the terminal having sent the name resolution message.

By correlated identifiers, it should herein be understood identifiers related by a dependency relationship (for example an identifier and an encoded version of this identifier). For example, if the identifier of the entity emitting the request is an address formed from a prefix (for example an IPv6/64 prefix) assigned to the terminal, the second name resolution server decides that there is correlation.

Thus, the legitimate second name resolution server 55 may in particular verify whether the name resolution request used for the verification originates from the terminal 51 identified by the network controller 54, and decide not to process the name resolution request (by constructing a response from the verification test(s)) only if it originates from the terminal 51 identified by the network controller 54.

A second embodiment is described hereinafter according to which the DNS traffic redirection management action consists in sending an indication of a failure of a connection of the terminal with the second name resolution server.

According to this second embodiment, the invention proposes a solution allowing establishing a connection with the second name resolution server 55, following an authentication failure. To do so, a new address may be generated to join the second name resolution server.

For example, according to this second embodiment, the execution of an action such as "sending an indication of a failure of a connection of the terminal with the second name resolution server" comprises the transmission, by the terminal 51 to the first name resolution server 52, of an indicator requiring the generation of at least one new identifier from the second name resolution server 55. For example, such an indicator may be inserted in the body or the header of the name resolution message transmitted from the terminal 51 to the first name resolution server 52 during step 511, or in another message. For example, such an indicator may be transmitted to the first name resolution server 52 when the terminal 51 fails to authenticate the second name resolution server 55 (authentication failure).

In this case, upon receipt of the indicator requiring the generation of at least one new identifier from the second name resolution server 55, the first name resolution server 52 may transmit to the authorisation server 53 a request for the generation of at least one new identifier of the second name resolution server. The authorisation server 53 may transmit the request to the network controller 54, which in turn may transmit it to the legitimate second name resolution server 55. Alternatively, the first name resolution server may communicate directly with the legitimate second name resolution server 55.

Upon receipt of this request, the legitimate second name resolution server 55 may generate at least one new identifier, and transmit to the network controller 44 the new identifier(s). The network controller 54 may forward the new identifier(s) from the second name resolution server 55 to the authorisation server 53, which may in turn forward them to the first name resolution server 52. Alternatively, the legitimate second name resolution server 55 may communicate directly with the first name resolution server.

A new identifier may be an IP address, but other identifiers may alternatively be considered (domain name, port number or certificate, for example).

The first name resolution server 52 may transmit to the terminal 51 the new identifier(s) of the second name resolution server 55, for example in the redirection message.

The two embodiments described hereinabove may be implemented simultaneously or successively.

Moreover, it should be noted that the first domain name resolution server, the authorisation server and/or the network controller may be the same entity or distinct entities. Thus, the functions associated with the first domain name resolution server, with the authorisation server and/or with the network controller may be embedded in the same node or in distinct nodes.

For example, the exchanges between the terminal 51 and the first name resolution server 52 or the second name resolution server 55 use the DoH protocol. Hence, the terminal 51 is a DoH client.

In particular, the name resolution message may be a message of the DoH GET type, and the redirection message of the DoH "3xx" type (which will be called hereinafter DoH REDIRECT).

Of course, other protocols may be used. For example, the DNS exchanges may rely on protocols such as DoQ, etc.

In particular, the disclosed traffic redirection method applies independently of the transport protocol used by the name resolution service. In particular, if an IP network is considered, the transport protocol used by the DNS communications may interchangeably be IPv4 or IPv6 (depending on the conditions of access to the network, in particular).

Thus, the proposed solution offers at least one of the following advantages, depending on the considered embodiment:

guarantee the availability of the services offered to the clients (and in particular the DNS-based services) and avoid the degradation of the quality of experience perceived by the clients, offer a set of reliable and robust name resolution services, while minimising modifications of existing infrastructures and protocols required to provide such services, detect attacks and data interception within a computer network (domestic or internal enterprise network) by malicious equipment, which may serve as a relay for such attacks, enable an operator to continue offering value-added services to its clients, in particular based on name resolution, including the activation of a second name resolution server, for example a "DNS forwarder" hosted by a CPE, improve the confidence of the user in the operator with which he has subscribed to such name resolution services, have a restricted list of "trusted" authorised servers.

5.2 Description of a Particular Embodiment

Different exemplary implementations of the invention for the management of the redirection of the DNS traffic of a terminal are described hereinafter. For example, it is considered that the DoH protocol is used to encrypt the DNS messages, so that the terminal and the name resolution server(s) could communicate via a secure channel.

Next, by "legitimate DNS server", it should be understood a name resolution server declared or configured by the operator and for example hosted in the access network, but other servers may be considered (for example, DNS servers operated by third parties).

Next, by "malicious" equipment or entity, it should also be understood a machine of the communication network that usurps or announces information allowing intercepting the DNS traffic (for example, a machine usurping the identity of a legitimate DNS server or usurping the identity of the default router through which the DNS traffic transits).

It should be noted that no assumption is made as to the nature of the malicious device. This may consist, for example, of a device installed by the user, a visitor (for ex. guest) equipment, a piece of equipment located in the coverage area of the WLAN network, a piece of equipment for accessing the network of the operator (CPE), etc.

For example, the communication network is a home computer network or a corporate network, also called local area network or LAN.

It is considered that the operator of the access network wishes to set up a DNS traffic redirection procedure, for example because some services offered to the terminals connected to the local area network require the activation of a name resolution server in the local area network ("forwarder DNS"). This is for example the case of terminals such as connected objects, printers, etc.

For example, it is considered that this name resolution server, also called second name resolution server, is hosted by a CPE, associated with at least one network interface between the local area network and the access network, and defined as a default router for the terminals on the local area network. Other routers may be deployed in the local area network, for example a home router different from the CPE and installed to segment the traffic of the LAN between the private traffic and the professional traffic. Nonetheless, the traffic between the local area network and the access network transiting through the CPE, the CPE is considered to be a default router. Alternatively, the second name resolution server may be another entity connected to the local area network.

As illustrated in FIG. 6, to set up a DNS traffic redirection procedure, a terminal 61 emits a name resolution message to a first DoH server 62. For example, such a DoH request is of the DoH GET or DoH POST type.

Upon receipt of the DoH request, the first DoH server 62 may interface with an authorisation server 63 to retrieve the instructions to be applied when a new connection should be set up.

To do so, the first DoH server 62 transmits to the authorisation server 63 a redirection authorisation verification request, for example of the "Access-Request" type.

The authorisation server 63 may identify a second DoH server of the local area network (for example embedded in the CPE) to be used for the redirection of the traffic from at least one identifier of the terminal, for example its IPv4 address, and/or an IPv6 prefix used by the DoH client to emit the DoH request, and/or the DNS identifier of the certificate of the terminal 61 (DNS-ID), etc.

For example, a database of the active clients is used to identify a second DoH server. In particular, the operator may keep the list of services and associated information up to date.

Hence, it is assumed, according to this example of implementation, that the authorisation server 63 maintains a list of DoH terminals/clients eligible for the redirection of the DNS traffic.

For example, such an authorisation server 63 is a RADIUS server ("Remote Authentication Dial-In User Service" as described in the document RFC 2865, "Remote Authentication Dial In User Service (RADIUS)", C. Rigney et al., June 2000), and new RADIUS attributes are defined to identify a second DoH server associated with a DoH client. For example, such attributes include a domain name configured for the second DoH server (ADN or "Authentication Domain Name"), at least one address (for example an internal address) to be used to reach the second DoH server ("Locators"), possibly an alternative port number ("Port") for the DoH service, etc.

Thus, the authorisation server 63 may communicate these different information (domain name, addresses, alternative port number, etc.) to the first DoH server 62, in response to the redirection authorisation verification request, for example in a "Access-Accept" type message. In particular, the addresses/port number may be communicated in the response in addition to the domain name so as to avoid a DoH client asking another server (which may be malicious) for the resolution of this domain name.

In particular, the first DoH server 62 may relay this information to the terminal 61 in a "DoH REDIRECT" message.

Thus, the terminal 61 may proceed with the redirection of the DNS requests to the second DoH server (for example a "DNS forwarder" embedded in the CPE) and the establishment of a DoH session with the second DoH server.

In particular, the terminal 61 may execute at least one action for managing the redirection of the DNS traffic of the terminal to the second name resolution server, in particular if it detects an authentication problem or if it has doubts about the legitimacy of the second DoH server.

According to the previously-described first embodiment, the terminal may in particular execute an action such as the verification of the legitimacy of said second name resolution server.

Thus, upon initialisation of the redirection of the traffic or following the set-up of the redirection of the DNS traffic to the second DoH server, the terminal may proceed with the verification of the legitimacy of the second DoH server. Indeed, the terminal may suspect an entity that presents itself as being the second DoH server of being malicious and avoids the DNS requests that the terminal emits being redirected to such an entity if it turns out to be malicious.

In this case, as illustrated in FIG. 7A, the terminal 71 may transmit to the first DoH server 72 an indicator requiring the verification of the legitimacy of the second DoH server.

For example, the terminal 71 inserts a new object ("fwd-check") in the header of a DoH GET resolution message (or in the body of the DoH POST message) to indicate to the first DoH server 72 that it wishes to set up a procedure for verifying the legitimacy of the second DoH server.

Upon receipt of this DoH GET (fw-check) request, which includes the "fwd-check" object, the first DoH server 72 asks the authorisation server 73 to verify whether the redirection is activated for this client, for example by transmitting a redirection authorisation verification request of the "Access-Request" type as described before. The authorisation server 73 may respond by transmitting an "Access-Accept" type response as described before.

The first DoH server 72 also informs the authorisation server 73 that it will set up a verification procedure coordinated with the terminal 72. For example, the first DoH server 72 may transmit to the authorisation server 73 at least one piece of information for verifying the legitimacy of the second DoH server, for example in an "Accounting-Request" type message. Thus, the first DoH server 72 may communicate to the authorisation server 73 the descriptive information of at least one test ("CHECK") possibly as well as a deadline ("T") for the execution of the test by the terminal 71.

For example, each test is a unique DNS entry that is known only to the operator, and therefore to the first DoH server 72. A test may be defined using a type, a DNS request ("check-query") and an associated reply ("check-reply").

The authorisation server 73 then transmits to a network controller at least one identifier of the terminal 71 as well as the information for verifying the legitimacy of the second DoH server (descriptive information of at least one test ("CHECK") possibly as well as a deadline ("T") for the execution of the test by the terminal 71). For example, such a network controller is the auto-configuration server ("Auto-Configuration Server (ACS)") of the CWMP protocol.

For example, the information for verifying the legitimacy of the second DoH server is formatted according to YANG semantics.

An example of a tree structure ("tree structure") of the YANG module used by the authorisation server 73 and the network controller is given in the appendix.

If the second DoH server is not hosted by the CPE, the authorisation server 73 also transmits at least one identifier of the second DoH server. It should be noted that if the second DoH server is hosted by the CPE, the network controller may directly obtain the identifier(s) of the second DoH server from the information at its disposal.

The network controller, also called the orchestrator, transmits to the legitimate second DoH server the information for verifying the legitimacy of the second DoH server (descriptive information of at least one test ("CHECK") possibly as well as a deadline ("T") for the implementation of the test).

The network controller also transmits to the legitimate second DoH server at least one identifier of the terminal 71 concerned by the verification procedure.

As illustrated in FIG. 8, the exchanges between the authorisation server 73 and the network controller 74 may be implemented in a secure communication channel, for example according to the NETCONF or RESTCONF protocols. The exchanges between the network controller 74 and the second DoH server 75 may also be implemented in a secure communication channel, for example according to the NETCONF or RESTCONF protocols (as described in the document RFC8071 ("NETCONF Call Home and RESTCONF Call Home", K. Wasten, February 2017) or TR-069 (CWMP standing for "CPE WAN Management Protocol")).

Likewise, the first DoH server 72 may communicate to the terminal 71 the information for verifying the legitimacy of the second DoH server, for example in the DoH REDIRECT redirection message (CHECK, T).

An example of a JSON object used by the first DoH server 72 to communicate the verification information to the terminal 71 is presented in the appendix.

Compared to the example given in the prior art, such a JSON object therefore describes a test to be implemented to verify the legitimacy of the second DoH server, in particular a test type ("check-rrtype"), a test-request ("check-query"), and a response to the test-request ("check-reply"). "check-rrtype" indicates a DNS resource type ("Resource Records Type").

According to the example above, upon receipt of this redirection message, and after 5 s (deadline defined in the "timer"), the terminal 71 sends a test request of the "txt" type for the domain name "test47fsgugsdf4zjou. defhiyef.isp" ("check-query"), using the identifier of the second DoH server received from the first DoH server 72.

The entity that receives this test-request proceeds with the processing of the request.

If the entity receiving this request constructs a response, sends it to the terminal 71, and this response corresponds to that communicated directly by the first DoH server 72 ("check-reply"), the terminal 71 concludes that this entity is actually the legitimate second DoH server.

If the entity receiving this request is malicious, for example because it has usurped the identity of the second DoH server, it may adopt several strategies:

- emulate a response and send it to the terminal 71: the probability that this response corresponds to that communicated directly by the first DoH server 72 ("check-reply") is almost zero. The terminal 71 then detects an inconsistency in the received response, and considers that the entity having received the name resolution request;
- relay the request to the nominal server (i.e., that one configured by the local area network): a negative response will be sent because only the legitimate second DoH server has the response;
- relay the request to the legitimate second DoH server: a negative response will then be sent by the second DoH server, because the second DoH server may verify whether the name resolution request actually originates from the terminal, based on the identifier(s) of the terminal received from the network controller (for example, by applying filters based on at least one identifier of the terminal);
- relay the request to another malicious server: a negative response will be sent.

If no response to the test request ("check-query") is received by the terminal 71, or if a response is presented but the response does not correspond to that communicated directly by the legitimate first DoH server ("check-reply"), then the terminal 71 concludes that the entity that could be reached using the identifier of the second DoH server received from the first DoH server 72 is malicious, and it may then set up a procedure allowing deactivating the local redirection of the traffic.

According to a variant illustrated in FIG. 7B, it is also possible to verify the legitimacy of the second DoH server by default, for example upon initialisation of the redirection of the traffic or upon start-up of the second DoH server.

In this case, as illustrated in FIG. 7B, upon receipt of a name resolution message emitted by the terminal 71, the first DoH server 72 asks the authorisation server 73 to verify whether the redirection is activated for this client, for example by transmitting a redirection authorisation verification request of the "Access-Request" type as described before. The authorisation server 73 may respond by transmitting an "Access-Accept" type response, including for example at least one piece of information for verifying the legitimacy of the second DoH server, for example the descriptive information of at least one test ("CHECK") as described before.

The first DoH server 72 may communicate to the terminal 71 the redirection information (ADN, LOCATORS, PORT, etc.) as well as the information for verifying the legitimacy of the second DoH server, for example in the redirection message DoH REDIRECT (CHECK).

If the terminal 71 detects an anomaly during the execution of the verification procedure (or during the authentication of the second server as described hereinafter), it may set up a procedure allowing deactivating the local redirection of the traffic.

According to the previously-described second embodiment, the terminal may also execute an action such as sending an indication of a failure of a connection of the terminal with the second name resolution server.

For example, upon initialisation of the redirection of the traffic, the terminal may detect that the authentication procedure of the second DoH server has failed. In this case, the connection cannot be established between the terminal and the second DoH server. Hence, no service is locally available for the terminal.

This second embodiment may possibly be implemented following the first embodiment, for example following the emission of a name resolution request by the terminal. In particular, the authentication failure may be due to the presence of a malicious server that usurps the identity (for example its IP address) of the second DoH server.

In this case, as illustrated in FIGS. 9A and 9B, the terminal 91 may transmit to the first DoH server 92 an indicator requiring the generation of at least one new identifier of the second name resolution server.

For example, the terminal 91 inserts a new object ("redirect-auth-failed") in the header of a DoH GET resolution message (or in the body of the DoH POST message) to indicate to the first DoH server 92 that it wishes to set up a procedure for verifying the identity of the second DoH server, because the authentication of the second DoH server has failed.

After receiving this DoH GET (redirect-auth-failed) request, which includes the "redirect-auth-failed" object, the first DoH server 92 transmits to the authorisation server 93 a request to generate at least one new identifier of the second name resolution server, to inform it that it wishes to set up a procedure for adding a new address to join the second name resolution server. For example, such a request is an "Accounting-Request" message including a new "Address Add" attribute.

The authorisation server 93 transmits the request generating at least one new identifier of the second name resolution server to the network controller, which in turn transmits it to the legitimate second DoH server if the second DoH server is hosted in a default router defined for the network (for example a CPE), or to the default router otherwise. Upon receipt of this request, the default router (which may be the legitimate second DoH server) may generate at least one new address (used locally for the DNS service, in particular).

In particular, the network controller informs the default router (which may be the legitimate second DoH server) that this address should only be announced to the identified terminal.

For example, the exchanges between the authorisation server 93 and the network controller for the provision of a new identifier of the second DoH server used by the DNS services and not announced on the LAN may be formatted according to YANG semantics.

An example of a structure of the YANG module used to this end is disclosed in the appendix.

As described in the module, one or more new identifier(s) ("new-address") may be generated by the default router. The type of action is indicated by the "type" attribute.

Afterwards, the new identifier(s) are sent to the network controller, which transmits them to the authorisation server 93. For example, as illustrated in FIG. 8, the exchanges between the authorisation server 93 and the network controller may be implemented in a secure communication channel, for example according to the NETCONF or REST-CONF protocols, and the exchanges between the controller network and the second DoH server or the default router may be implemented in a secure communication channel, for example according to the NETCONF, RESTCONF, or TR-069 protocols.

A new domain name, ADN', may be configured by the authorisation server 93 for the second DoH server associated with the new identifier (LOC') to be used to join the second DoH server. Possibly, an authentication certificate may be created. Other information (for example "URI Template") may also be modified.

According to a first variant illustrated in FIG. 9A, the first DoH server 92 transmits to the authorisation server 93 the "Accounting-Request" request for the generation of at least one new identifier of the second name resolution server following the reception of the DoH GET(redirect-auth-failed) request.

The first DoH server 92 also transmits to the authorisation server 93 a redirection authorisation verification request of the "Access-Request" type as described before.

The authorisation server 93 may transmit to the first DoH server 92 the new information (new domain name ADN', new identifier of the second DoH server LOC', etc.) in the previously-described "Access-Accept" type response.

According to a second variant illustrated in FIG. 9B, the first DoH server 92 transmits to the authorisation server 93 a redirection authorisation verification request of the "Access-Request" type as described before, upon receipt of the DoH GET (redirect-auth-failed) request.

The authorisation server 93 may respond by transmitting an "Access-Accept" type response as described before with reference to FIGS. 6 and 7.

The first DoH server 92 may then transmit to the authorisation server 93 the "Accounting-Request" request for the generation of at least one new identifier of the second name resolution server.

The authorisation server 93 may respond by transmitting to the first DoH server 92 the new information (ADN', LOC', etc.), for example in a change of authorisation request (CoA, "Change of Authorisation").

Upon completion of these exchanges (according to the first or second variant, or any other variant enabling the first DoH server 92 to obtain the new information (ADN', LOC', etc.), the new redirection information (AND', LOC', etc.) are communicated to the terminal 91, for example in the redirection message DoH REDIRECT.

An example of a JSON object used by the first DoH server 92 to communicate to the terminal 91 the new redirection information is presented in the appendix.

Compared to the example given in the prior art, such a JSON object therefore describes new addresses to be used to communicate with the second DoH server.

According to the example hereinabove, upon receipt of this redirection message, the terminal 91 may emit a name resolution request using the new identifier(s) of the second DoH server received from the first DoH server 92, i.e., the new addresses "192.0.2.5" or "2001:db8::5", possibly using the new domain name ADN'.

If no connectivity problem is encountered by the terminal 91 when establishing the connection, no more action is required.

Otherwise, the terminal 91 may re-establish the connection with the DNS server of the operator (first DoH server 92) and indicate to the first DoH server 92 that the migration (to redirect the DNS traffic to the second DoH server) has failed.

In particular, the terminal 91 may set up a procedure allowing deactivating the local redirection of the traffic.

Thus, regardless of the embodiment, the terminal may set up a procedure allowing deactivating the local redirection of the traffic, for example if it detects the presence of a malicious server and/or if it detects a problem of authentication/connectivity with the second DoH server.

In this case, as illustrated in FIGS. 10A and 1013, the terminal 101 may transmit to the first DoH server 102 an indicator requesting the deactivation of the redirection of the traffic to the second DoH server.

For example, the terminal 101 inserts a new object ("rd-disable") in a DoH GET resolution message to indicate to the first DoH server 102 that it wishes to set up a procedure for deactivating the redirection of the traffic. Note that such DoH GET requests are not processed locally but by the first DoH server provided by the network. Hence, these exchanges cannot be intercepted by a malicious local server.

Upon receipt of this DoH GET (rd-disable) request, the first DoH server 102 contacts the authorisation server 103 to either ask it for authorisation before proceeding with the deactivation of the redirection, or to inform it on the deactivation of the redirection for terminal 101.

According to a first variant illustrated in FIG. 10A, the first DoH server 102 asks for authorisation from the authorisation server 103 before proceeding with the deactivation, for example in the "Access-Request" message.

The authorisation server 103 may respond by sending an "Access-Accept" type message including a new STATUS attribute.

According to a second variant illustrated in FIG. 1013, the first DoH server 102 informs the authorisation server 103 on the deactivation of the redirection of the traffic for the terminal 101, for example in the "Accounting-Request" message.

In the different embodiments/variants described hereinabove, the authorisation server 53, 63, 73, 93, 103 may be a RADIUS server.

For example, the formats of the new RADIUS attributes are for example:

for the "ADN" attribute:

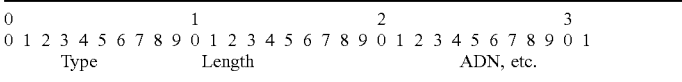

or the "LOCATOR" attribute:

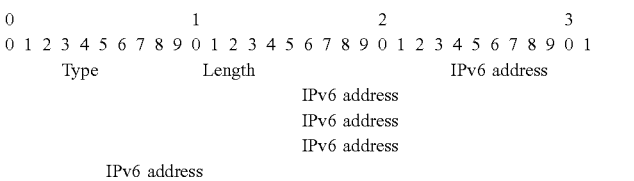

or the "PORT" attribute:

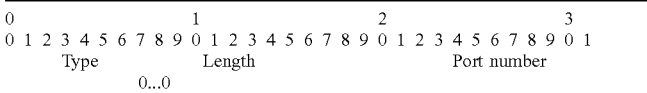

for the "CHECK" attribute:

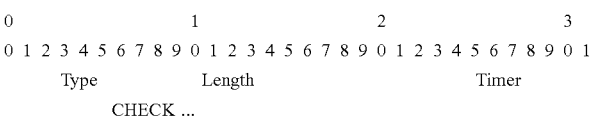

for the "Address Add" attribute:

```
0                   1                   2                   3
0 1 2 3 4 5 6 7 8 9 0 1 2 3 4 5 6 7 8 9 0 1 2 3 4 5 6 7 8 9 0 1
    Type            Length                  Timer, ...
``` for the "STATUS" attribute:

```
0                   1                   2                   3
0 1 2 3 4 5 6 7 8 9 0 1 2 3 4 5 6 7 8 9 0 1 2 3 4 5 6 7 8 9 0 1
    Type            Length                  STATUS ...
```

An exemplary implementation has been described above according to which the legitimate second name resolution server is a default router defined for the local area network, for example a CPE.

Of course, this is just an example, and the second name resolution server may be embedded in a terminal of the local area network, a key, etc., possibly enabling connection sharing to access the local area network, configured by a user with the identity of its default router and a list of legitimate DNS servers (in particular the first name resolution server).

Moreover, it should be noted that the above-described procedure may be activated/deactivated by a user or administrator of an entity of the local area network. In particular, the activation or deactivation request mechanism may be executed during the set-up of the CPE, during a connection to the management interface of the CPE, through a notification sent by the operator, etc.

5.3 Simplified Structure of the Different Entities

Finally, referring to FIG. 11, the simplified structures of an entity, for example a terminal, a first name resolution server, a second name resolution server, an authorisation server, or a network controller according to at least one embodiment described hereinabove.

As illustrated in FIG. 11, such an entity comprises at least one memory 111 comprising a buffer memory, at least one processing unit 112, equipped for example with a programmable computer or a dedicated computer, for example a processor P, and controlled by the computer program 113, implementing steps of at least one method according to at least one embodiment of the invention.

Upon initialization, the code instructions of the computer program 113 are for example loaded into a RAM memory before being executed by the processor of the processing unit 112.

If the entity is a terminal, the processor of the processing unit 112 implements steps of the previously-described name resolution method, according to the instructions of the computer program 113, to:

transmit, to a first name resolution server, a name resolution message via a secure communication channel between said terminal and said first name resolution server, obtain at least one identifier from a second name resolution server for said redirection, execute at least one action for managing said redirection of the DNS traffic of the terminal to the second name resolution server, at least from among:

verifying the legitimacy of said second name resolution server, sending an indication of a failure of a connection of the terminal with said second name resolution server, requesting the deactivation of said redirection of the DNS traffic to said second name resolution server.

If the entity is a first name resolution server, the processor of the processing unit 112 implements steps of the previously-described method for processing a redirection of a DNS traffic authorised for a terminal, according to the instructions of the computer program 113, to:

receive a name resolution message from said terminal, via a secure communication channel between said terminal and said first name resolution server, obtain, from an authorisation server, a redirection authorisation for said terminal and at least one identifier of a second name resolution server identified for said terminal for said redirection, and transmit, to said terminal, a redirection message bearing said at least one identifier of a second name resolution server.

If the entity is a second name resolution server, the processor of the processing unit 112 implements steps of the previously-described method for managing a redirection of a DNS traffic authorised for a terminal, according to the instructions of the computer program 113, to:

exchange information with a controller of the network, said information comprising at least one piece of information, provided by the controller to the second name resolution server, for verifying by said terminal the legitimacy of the second name resolution server and/or at least one piece of information, provided by the second name resolution server to the controller, for the resolution of a failure of a connection of the terminal with the second name resolution server.

If the entity is an authorisation server, the processor of the processing unit 112 implements steps of the previously-described method for authorising a redirection of a DNS traffic of a terminal, according to the instructions of the computer program 113, to:

obtain at least one identifier of a second name resolution server identified for said terminal for said redirection, and transmit, to said first name resolution server, a redirection authorisation for said terminal and said at least one identifier of a second name resolution server.

If the entity is a network controller, the processor of the processing unit 112 implements steps of the previously-described method for controlling a redirection of a DNS traffic authorised for a terminal, according to the instructions of the computer program 113, to:

exchange information with a second name resolution server identified for the terminal for said authorised redirection of the DNS traffic of the terminal, said information comprising at least one piece of information, provided by the controller to the second name resolution server, for verifying by said terminal the legitimacy of the second name resolution server and/or at least one piece of information, provided by the second name resolution server to the controller, for the resolution of a failure of a connection of the terminal with the second name resolution server.

APPENDIX

An example of a JSON object returned by the DoH server 32 of the operator is:

```
{
    "associated-resolvers": {
        "adn": {
            {
                "name": "mon-cpe.exemple.net",
                "uri-template": {
                    https://mon-cpe.exemple.net/dns-query{?dns}
                },
                "a": {
                    "192.0.2.1"
                },
                "aaaa": {
                    "2001:db8::1"/
                },
                "ttf": 3600
            }
        }
    }
}
```

An example of the tree structure of the YANG module used by the authorisation server 73 and the network controller is:

```
module: radius-control
    +−rw encrypted-dns-control
        +−rw customer* [id]
        / +−rw id                     string
        / +−rw prefix*                inet:ip-prefix
        / +−rw address*               inet:ip-address
        / +−rw mac-addess             yang:mac-address
        / +−rw action
        / +−rw type                   enumeration
        / / +−rw check-query*         inet:domain-name
        / / +−rw check-rrtype*        dnsct:rr-type
        / / +−rw check-reply*         string
        / / +−rw timer?               int32
            ...
```

An example of a JSON object used by the first DoH server 72 to communicate the verification information to the terminal 71 is:

```
{
    "associated-resolvers": {
        "adn": {
            {
                "name": "mon-cpe.exemple.net",
                "uri-template": {
                    https://mon-cpe.exemple.net/dns-query{?dns}
                },
                "a": {
                    "192.0.2.1"
                },
                "aaaa": {
                    "2001:db8::1"/
                },
```

-continued

```
                "check-rrtype": "txt"
                "check-query": {
                    "test47fsgugsdf4zjou.defhiyef.isp"
                }
                "check-reply": {
                    "sdfsdf54875ret48re2cs8282z"
                }
                "timer": 5/
                "ttf": 3600
            }
        }
    }
}
```

An example of the structure of the YANG module used for the exchanges between the authorisation server 93 and the network controller for the supply of a new identifier of the second DoH server used by the DNS services, and not announced on the LAN, is:

```
module: radius-control
    +−rw encrypted-dns-control
        +−rw customer* [id]
        / +−rw id                     string
        / +−rw prefix*                inet:ip-prefix
        / +−rw action
        / / +−rw type                 enumeration
        / / +−rw new-address*         inet:ip-address
        / / +−rw timer?               int32
            ...
```

An example of a JSON object used by the first DoH server 92 to communicate the new redirect information to the terminal 91 is:

```
{
    "associated-resolvers": {
        "adn": {
            {
                "name": "mon-cpe.exemple.net",
                "uri-template": {
                    https://mon-cpe.exemple.net/dns-query{?dns}
                },
                "a": {
                    "192.0.2.1"
                },
                "aaaa": {
                    "2001:db8::5"
                },
                "ttf": 3600
            }
        }
    }
}
```

The invention claimed is:

1. A name resolution method, implemented in a terminal connected to a communication network, wherein the method comprises:

transmitting, to a first name resolution server, a name resolution message via a secure communication channel between said terminal and said first name resolution server, in response to a redirection of Domain Name System (DNS) traffic of the terminal being authorized by an authorization server, obtaining at least one identifier of a second name resolution server identified for said terminal for said redirection, and executing at least one action for managing said redirection of the DNS traffic of the terminal to the second name resolution server, at least from among:

verifying legitimacy of said second name resolution server, sending an indication of a failure of a connection of the terminal with said second name resolution server, requesting deactivation of said redirection of the DNS traffic to said second name resolution server.

2. The method according to claim 1, wherein sending the indication of a failure of the connection of the terminal with said second name resolution server comprises obtaining a new identifier from the second name resolution server.

3. The method according to claim 1, wherein verifying the legitimacy of the second name resolution server comprises:

receiving at least one piece of information for verifying the legitimacy of said second name resolution server, and verifying legitimacy of an entity emitting a response to a name resolution request, emitted by said terminal and generated from said at least one piece of information, by comparing said response with a test response obtained from said at least one piece of information.

4. A method for controlling a Domain Name System (DNS) traffic redirection authorized by an authorization server for a terminal in a communication network, said terminal having emitted a name resolution message via a secure communication channel between said terminal and a first name resolution server, said method being implemented in a controller of said network and comprising:

exchanging information with a second name resolution server identified for the terminal for said authorized DNS traffic redirection of the terminal, said information comprising at least one piece of information, provided by the controller to the second name resolution server, for verifying by said terminal legitimacy of the second name resolution server and/or at least one piece of information, provided by the second name resolution server to the controller, for resolution of a failure of a connection of the terminal with the second name resolution server; and assisting the terminal in the execution of an action for managing the redirection of the DNS traffic based on the exchanged information.

5. The method according to claim 4, wherein said information comprises the at least one piece of said information provided by the second name resolution server for the resolution of a failure of a connection of the terminal with the second name resolution server, the at least one piece of information comprising at least one new identifier of said second name resolution server, said method further comprising transmitting, to a network authorization server, said at least one new identifier.

6. The method according to claim 4, wherein the method comprises obtaining, from a default router defined for the communication network, at least one new identifier of said second name resolution server, and transmitting, to an authorization server of the network, said at least one new identifier.

7. The method according to claim 4, wherein the method comprises, during said information exchange, transmitting to said second name resolution server at least one identifier of said terminal authorized to verify the legitimacy of the second name resolution server, or at least one identifier of a network to which said terminal belongs.

8. A method for managing a Domain Name System (DNS) traffic redirection authorized by an authorization server for a terminal in a communication network, said terminal having emitted a name resolution message via a secure communication channel between said terminal and a first name resolution server, said method being implemented in a second name resolution server of said network identified for said terminal for said redirection, and wherein the method comprises:

exchanging information with a controller of the network, said information comprising at least one piece of information, provided by the controller to the second name resolution server, for verifying by said terminal legitimacy of the second name resolution server and/or at least one piece of information, provided by the second name resolution server to the controller, for resolution of a failure of a connection of the terminal with the second name resolution server; and assisting the terminal in the execution of an action for managing the redirection of the DNS traffic based on the exchanged information.

9. The method according to claim 8, wherein the method comprises transmitting to said terminal a response to a name resolution request, said response carrying a test response obtained from at least one identifier of the terminal and said at least one piece of information for verifying the legitimacy of said second name resolution server obtained during the exchange with the controller.

10. The method according to claim 8, wherein the method comprises:

generating at least one new identifier of said second name resolution server, transmitting, to said network controller, said at least one new identifier during the exchange with said controller.

11. A method for processing a redirection of a Domain Name System (DNS) traffic authorized for a terminal in a communication network, implemented in a first name resolution server of said network, wherein said method comprises:

receiving a name resolution message from said terminal, received via a secure communication channel between said terminal and said first name resolution server, obtaining, from an authorization server, a redirection authorization of DNS traffic for said terminal and at least one identifier of a second name resolution server identified for said terminal for said redirection, and transmitting, to said terminal, a redirection message bearing said at least one identifier of a second name resolution server.

12. The method according to claim 11, wherein the method also comprises, following an indication from said terminal to verify a legitimacy of said second name resolution server:

obtaining at least one piece of information for verifying the legitimacy of said second name resolution server, and transmitting to said terminal said at least one verification piece of information.

13. The method according to claim 11, wherein the method comprises, following an indication from said terminal of a failure of a connection with said second name resolution server:

obtaining, from said authorization server, at least one new identifier of said second name resolution server, transmitting, to said terminal, said at least one new identifier of said second name resolution server.

14. The method according to claim 11, wherein the method comprises deactivating the DNS traffic redirection to said second name resolution server following at least one failure of a connection of the terminal with said second name resolution server, or deactivating a DNS traffic redirection to a third name resolution server designated by default for the terminal upon request of said terminal.

15. A method for authorizing a redirection of Domain Name System (DNS) traffic of a terminal in a communication network, implemented in an authorization server of said network, said terminal having emitted a name resolution message via a secure communication channel between said terminal and a first name resolution server, wherein the method comprises, in response to a redirection of the DNS traffic of the terminal being authorized:

obtaining at least one identifier of a second name resolution server identified for said terminal for said redirection, and transmitting, to said first name resolution server, a redirection authorization for said terminal and said at least one identifier of a second name resolution server.

16. The method according to claim 15, wherein the method also comprises transmitting, to a controller of said network, at least one element belonging to the group consisting of:

at least one identifier of said terminal, at least one identifier of a network to which said terminal belongs, said at least one identifier of said second name resolution server, at least one piece of information for verifying a legitimacy of said second name resolution server.

17. The method according to claim 15, wherein the method comprises:

obtaining, from a controller of said network, at least one new identifier of said second name resolution server, and transmitting, to said first name resolution server, said at least one new identifier of said second name resolution server.

18. A terminal configured for a redirection of a Domain Name System (DNS) traffic in a communication network, wherein the terminal comprises:

a processor; and a non-transitory computer readable medium comprising instructions stored thereon which when executed by the processor configure the terminal to:

transmit, to a first name resolution server, a name resolution message via a secure communication channel between said terminal and said first name resolution server, obtain at least one identifier from a second name resolution server identified for said terminal for said redirection, said redirection of DNS traffic of the terminal being authorized by an authorization server, execute at least one action for managing said redirection of the DNS traffic from the terminal to the second name resolution server, at least from among:

verifying a legitimacy of said second name resolution server, sending an indication of a failure of a connection of the terminal with said second name resolution server, requesting deactivation of said redirection of the DNS traffic to said second name resolution server.

\* \* \* \* \*